United States Patent
Lee et al.

(10) Patent No.: US 9,967,571 B2
(45) Date of Patent: May 8, 2018

(54) METHOD FOR DECODING IMAGE AND APPARATUS USING SAME

(71) Applicant: Electronics and Telecommunications Research Institute, Daejeon (KR)

(72) Inventors: Ha Hyun Lee, Seoul (KR); Jung Won Kang, Daejeon (KR); Jin Ho Lee, Daejeon (KR); Jin Soo Choi, Daejeon (KR); Jin Woong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days. days.

(21) Appl. No.: 14/774,290

(22) PCT Filed: Dec. 17, 2014

(86) PCT No.: PCT/KR2014/012495
§ 371 (c)(1),
(2) Date: Sep. 10, 2015

(87) PCT Pub. No.: WO2015/102271
PCT Pub. Date: Jul. 9, 2015

(65) Prior Publication Data
US 2016/0316210 A1   Oct. 27, 2016

(30) Foreign Application Priority Data

Jan. 2, 2014 (KR) .................. 10-2014-0000413
Jan. 13, 2014 (KR) .................. 10-2014-0003760
(Continued)

(51) Int. Cl.
*H04N 19/159* (2014.01)
*H04N 19/184* (2014.01)
(Continued)

(52) U.S. Cl.
CPC ......... *H04N 19/159* (2014.11); *H04N 19/172* (2014.11); *H04N 19/184* (2014.11); *H04N 19/187* (2014.11); *H04N 19/30* (2014.11)

(58) Field of Classification Search
None
See application file for complete search history.

(56) References Cited

U.S. PATENT DOCUMENTS

2007/0086516 A1   4/2007  Lee et al.
2008/0175325 A1   7/2008  Hannuksela et al.
(Continued)

FOREIGN PATENT DOCUMENTS

CN      1794818 A        6/2006
KR   1020070042853 A     4/2007
(Continued)

OTHER PUBLICATIONS

Gerhard Tech et al., "Preliminary version of MV-HEVC Draft Text 6," JCT3V-F1004-v1 Oct. 25-Nov. 1, 2013, pp. 1-73, Geneva, Switzerland.
(Continued)

*Primary Examiner* — Frederick D Bailey
(74) *Attorney, Agent, or Firm* — William Park & Associates Ltd.

(57) ABSTRACT

A method of decoding a image according to an embodiment of the present invention, which supports a plurality of layers, may comprise the steps of: receiving information on a reference layer used to decode a current picture for inter-layer prediction; inducing the number of valid reference layer pictures used to decode the current picture on the basis of the information on the reference layer; and performing inter-layer prediction on the basis of the number of valid reference layer pictures.

15 Claims, 5 Drawing Sheets

(30) Foreign Application Priority Data

| Mar. 17, 2014 | (KR) | .................... | 10-2014-0030743 |
| Mar. 20, 2014 | (KR) | .................... | 10-2014-0033012 |
| Dec. 10, 2014 | (KR) | .................... | 10-2014-0177008 |

(51) Int. Cl.

| H04N 19/30  | (2014.01) |
| H04N 19/187 | (2014.01) |
| H04N 19/172 | (2014.01) |

(56) References Cited

U.S. PATENT DOCUMENTS

| 2010/0067581 | A1* | 3/2010  | Hong ................ H04N 19/105 375/240.16 |
| 2013/0114710 | A1  | 5/2013  | Park et al. |
| 2013/0114741 | A1  | 5/2013  | Sullivan et al. |
| 2013/0208792 | A1* | 8/2013  | He ................... H04N 19/00569 375/240.12 |
| 2014/0049604 | A1* | 2/2014  | Chen ................ H04N 19/597 348/43 |
| 2014/0050270 | A1  | 2/2014  | Lim et al. |
| 2014/0218473 | A1* | 8/2014  | Hannuksela ...... H04N 19/597 348/43 |
| 2015/0010051 | A1* | 1/2015  | Chen ................ H04N 19/105 375/240.02 |
| 2015/0016532 | A1* | 1/2015  | Chen ................ H04N 19/597 375/240.16 |
| 2015/0103904 | A1* | 4/2015  | Rapaka ............. H04N 19/597 375/240.12 |
| 2015/0334407 | A1* | 11/2015 | Rusert ............... H04N 19/70 375/240.12 |
| 2016/0227227 | A1* | 8/2016  | Deshpande ........ H04N 19/186 |

FOREIGN PATENT DOCUMENTS

| KR | 1020130050863 A | 5/2013  |
| KR | 1020130086011 A | 7/2013  |
| WO | 2012148139 A2   | 11/2012 |
| WO | 2013116415 A1   | 8/2013  |

OTHER PUBLICATIONS

Hahyun Lee et al., "MV-HEVC/SHVC HLS: comments on MV-HEVC WD 6 and SHVC WD 4," JCTVC-P0079 and JCT3V-G0092, Jan. 9-17, 2014, pp. 1-3, Joint Collaborative Team on Video Coding (JCT-VC) of ITU-T SG 16 WP 3 and ISO/IEC JTC 1/SC 29/WG 11, 16th Meeting, San José, US.

Hahyun Lee et al., "MV-HEVC/SHVC HLS: comments on MV-HEVC WD 6 and SHVC WD 4," JCTVC-P0079r1 and JCT3V-G0092r1, Jan. 9-17, 2014, pp. 1-4, Joint Collaborative Team on Video Coding (JCT-VC) of ITU-T SG 16 WP 3 and ISO/IEC JTC 1/SC 29/WG 11,16th Meeting, San José, US.

Hahyun Lee et al., "MV-HEVC/SHVC HLS: On inter-layer RPS signaling and derivation," JCTVC-Q0060 and JCT3V-H0024, Mar. 27-Apr. 4, 2014, pp. 1-4, Joint Collaborative Team on Video Coding (JCT-VC) of ITU-T SG 16 WP 3 and ISO/IEC JTC 1/SC 29/WG 11, 17th Meeting, Valencia, ES.

Hahyun Lee et al., "MV-HEVC/SHVC HLS: On inter-layer RPS signaling and derivation," JCTVC-Q0060r1 and JCT3V-H0024r1, Mar. 27-Apr. 4, 2014, pp. 1-6, Joint Collaborative Team on Video Coding (JCT-VC) of ITU-T SG 16 WP 3 and ISO/IEC JTC 1/SC 29/WG 11, 17th Meeting, Valencia, ES.

Heiko Schwarz et al., "Overview of the Scalable Video Coding Extension of the H.264/AVC Standard," IEEE Transactions on Circuits and Systems for Video Technology, Sep. 24, 2007, pp. 1103-1120, vol. 17, No. 9, IEEE.

Jianle Chen et al., "High efficiency video coding (HEVC) scalable extension Draft 4," JCTVC-O1008_v3, Oct. 23-Nov. 1, 2013, pp. 1-18, Joint Collaborative Team on Video Coding (JCT-VC) of ITU-T SG 16 WP 3 and ISO/IEC JTC 1/SC 29/WG 11, 15th Meeting, Geneva, Switzerland.

Jianle Chen et al., "High efficiency video coding (HEVC) scalable extension Draft 4," JCTVC-O1008_v3, Oct. 23-Nov. 1, 2013, pp. 1-100, Joint Collaborative Team on Video Coding (JCT-VC) of ITU-T SG 16 WP 3 and ISO/IEC JTC 1/SC 29/WG 11, 15th Meeting, Geneva, Switzerland.

Sachin Deshpande, "On Inter-layer Reference Picture Set", JCTVC-O0120 and JCT3V-F0065, Oct. 23-Nov. 1, 2013, pp. 1-6, Joint Collaborative Team on Video Coding (JCT-VC) of ITU-T SG 16 WP 3 and ISO/IEC JTC 1/SC 29/WG 11, 15th Meeting, Geneva, Switzerland.

\* cited by examiner

METHOD FOR DECODING IMAGE AND APPARATUS USING SAME

TECHNICAL FIELD

The present invention relates to video encoding and decoding, and more particularly, to methods and apparatuses for encoding and decoding a video supporting a plurality of layers in a bitstream.

BACKGROUND ART

In recent years, as high definition (HD) broadcast services are spreading domestically and globally, a large number of users are getting used to high-resolution and high-quality videos and accordingly institutions put spurs to the development of next-generation video devices. Also, with growing interest in ultrahigh-definition (UHD) services having a resolution four times higher than HDTV, compression techniques for higher-quality videos are needed.

For video compression, there may be used an inter prediction technique of predicting pixel values included in a current picture from temporally previous and/or subsequent pictures of the current picture, an intra prediction technique of predicting pixel values included in a current picture using pixel information in the current picture, or an entropy encoding technique of assigning a short code to a symbol with a high appearance frequency and assigning a long code to a symbol with a low appearance frequency.

Video compression technology may include a technique of providing a constant network bandwidth in restricted operating environments of hardware without considering variable network environments. However, to compress video data used for network environments involving frequent changes of bandwidths, new compression techniques are required, wherein a scalable video encoding/decoding method may be employed.

DISCLOSURE

Technical Problem

An aspect of the present invention is to provide a method of signaling layer information contained in a video encoded bitstream of a multilayer structure including a temporal layer, an interlayer prediction method and a method of obtaining a target output layer.

Another aspect of the present invention is to provide a method of accessing layer information specified in a video parameter set (VPS) in a bitstream for session negotiations without an entropy decoder and an apparatus using the same.

Still another aspect of the present invention is to provide a method of identifying a number of active interlayer reference pictures needed for decoding a current picture for utilization in interlayer prediction, a method of obtaining a target output layer and an apparatus using the same.

Technical Solution

An aspect of the present invention provides a method of decoding a video supporting a plurality of layers, the method including receiving information on a reference layer used for decoding a current picture for interlayer prediction; deriving a number of active reference layer pictures used for decoding the current picture based on the information on the reference layer; and performing interlayer prediction based on the number of active reference layer pictures.

All slices of the current picture may have the same number of active reference layer pictures.

When a layer identifier of a current layer including the current picture is 0, the number of active reference layer pictures may be derived to be 0.

When a number of direct reference layers of the current layer including the current picture is 0, the number of active reference layer pictures may be derived to be 0.

When a number of reference layer pictures, derived based on a number of direct reference layers of the current layer, maximum temporal sub-layer information of a reference layer, maximum allowed value of temporal sub-layer allowing inter-layer prediction in the reference layer and a temporal identifier of the current picture, in the same access unit as that of the current picture is 0, the number of active reference layer pictures may be derived to be 0.

When a layer identifier of the current layer including the current picture is 0 or a number of reference layer pictures available for interlayer prediction in the same access unit as that of the current picture is not 0, and all direct reference layer pictures belonging to all direct reference layers of the current layer including the current picture, being present in the same access unit as that of the current picture and being included in an interlayer reference picture set of the current picture are used as reference layer pictures for the current picture, the number of active reference layer pictures may be derived based on a variable indicating a number of direct reference layers of the current layer, maximum temporal sub-layer information on each layer, maximum allowed value of temporal sub-layer allowing inter-layer prediction in each layer and the temporal identifier of the current picture.

A number of pictures in a reference layer having maximum temporal sub-layer information greater than or equal to the temporal identifier of the current picture and maximum temporal sub-layer information allowing interlayer prediction greater than the temporal identifier of the current picture, among direct reference layer pictures for the current picture, may be used as the number of active reference layer pictures for decoding the current picture.

When interlayer prediction is not used for decoding the current picture, the number of active reference layer pictures may be derived to be 0.

When at most one picture is used for interlayer prediction for each picture in a coding video sequence or a number of direct reference layers of the layer including the current picture is 1, the number of active reference layer pictures may be derived to be 1.

When at most one picture is used for interlayer prediction for each picture in a coding video sequence or a number of direct reference layers of the layer including the current picture is 1, the number of active reference layer pictures may be derived to be 1 if a number of reference layer pictures available for decoding the current picture is greater than 0, and the number of active reference layer pictures may be derived to be 0 if the number of reference layer pictures available for decoding the current picture is 0.

When at most one picture is used for interlayer prediction for each picture in a coding video sequence or a number of reference layer pictures available for interlayer prediction in the same access unit as that of the current picture is 1, the number of active reference layer pictures may be derived to be 1.

When the information on the reference layer includes number information indicating a number of pictures used for decoding the current picture for interlayer prediction, the number of active reference layer pictures may be derived to be a value specified by the number information.

Advantageous Effects

According to an embodiment of the present invention, there are provided a method of signaling layer information present in a video encoded bitstream of a multilayer structure including a temporal layer, an interlayer prediction method, and a method of obtaining a target output layer.

According to another embodiment of the present invention, there are provided a method enabling even Media Aware Network Equipment (MANE) having no entropy decoder to access layer information in a bitstream for session negotiations and an apparatus using the same.

According to still another embodiment of the present invention, there are provided a method of accurately identifying a number of active interlayer reference pictures needed for decoding a current picture for utilization in interlayer prediction, a method of obtaining a target output layer and an apparatus using the same.

MODE FOR INVENTION

Hereinafter, embodiments of the present invention are described in detail with reference to the accompanying drawings. In describing the embodiments of the present invention, a detailed description of related known elements or functions will be omitted if it is deemed to make the gist of the present invention unnecessarily vague.

It will be understood that when an element is referred to as being "connected" or "coupled" to another element, the element can be directly connected or coupled to another element or intervening elements. Also, when it is said that a specific element is "included," it may mean that elements other than the specific element are not excluded and that additional elements may be included in the embodiments of the present invention or the scope of the technical spirit of the present invention.

Although the terms "first," "second," etc. may be used to describe various elements, these elements should not be limited by these terms. These terms are used only to distinguish one element from another element. For example, a first element may be named a second element without departing from the scope of the present invention. Likewise, a second element may be named a first element.

Although components described in the embodiments of the present invention are independently illustrated in order to show different characteristic functions, such a configuration does not indicate that each component is constructed by a separate hardware constituent unit or software constituent unit. That is, each component includes individual components that are arranged for convenience of description, in which at least two components may be combined into a single component or a single component may be divided into a plurality of components to perform functions. It is to be noted that embodiments in which some components are integrated into one combined component and/or a component is divided into multiple separate components are included in the scope of the present invention without departing from the essence of the present invention.

Some constituent elements are not essential to perform the substantial functions in the invention and may be optional constituent elements for merely improving performance. The present invention may be embodied by including only constituent elements essential to implement the spirit of the invention other than constituent elements used for merely improving performance. A structure including only the essential constituent elements other than optional constituents used for merely improving performance also belongs to the scope of the present invention.

Figure 1:
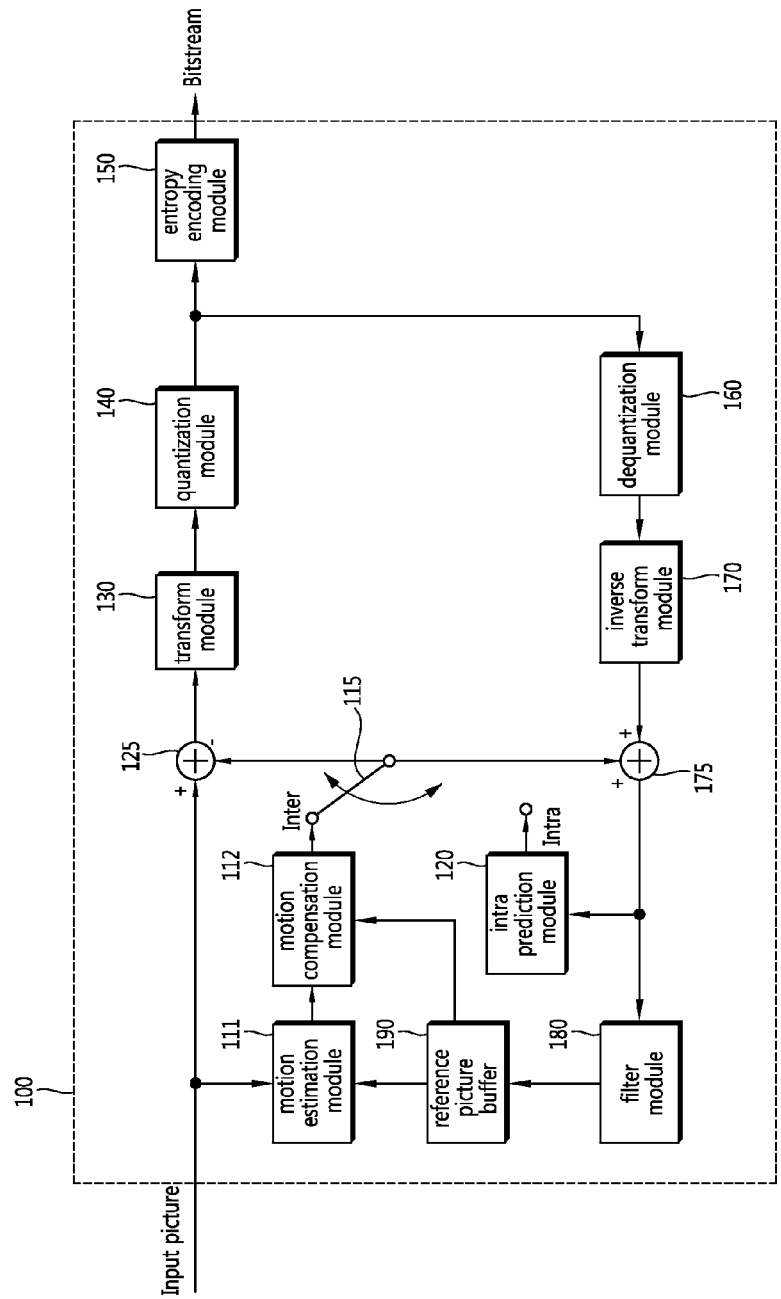
FIG. 1 is a block diagram illustrating a configuration of a video encoding apparatus according to an embodiment.

FIG. 1 is a block diagram illustrating a configuration of a video encoding apparatus according to an embodiment. A scalable video encoding/decoding method or apparatus may be realized by extension of a general video encoding/decoding method or apparatus that does not provide scalability, and the block diagram of FIG. 1 illustrates an example of a video encoding apparatus which may form a basis for a scalable video encoding apparatus.

Referring to FIG. 1, the video encoding apparatus 100 includes a motion estimation module 111, a motion compensation module 112, an intra prediction module 120, a switch 115, a subtractor 125, a transform module 130, a quantization module 140, an entropy encoding module 150, an dequantization module 160, an inverse transform module 170, an adder 175, a filter module 180, and a reference picture buffer 190.

The video encoding apparatus 100 may encode an input picture images in an intra mode or an inter mode and output a bitstream. Intra prediction means an intra-picture prediction, and inter prediction means an inter-picture prediction. In the intra mode, the switch 115 is shifted to 'intra,' and in the inter mode, the switch 115 is shifted to 'inter.' The video encoding apparatus 100 may generate a prediction block for an input block of the input picture and then encode a difference between the input block and the prediction block.

In the intra mode, the intra prediction module 120 may perform spatial prediction by using a pixel value of a pre-encoded block around a current block to generate a prediction block.

In the inter mode, the motion estimation module 111 may obtain a region which is most matched with the input block in the reference picture stored in the reference picture buffer 190 during a motion estimation process to derive a motion vector. The motion compensation module 112 may perform motion compensation using the motion vector and the reference picture stored in the reference picture buffer 190, thereby generating the prediction block.

The subtractor 125 may generate a residual block based on the difference between the input block and the generated prediction block. The transform module 130 may transform the residual block to output a transform coefficient. The quantization module 140 may quantize the transform coefficient according to a quantization parameter to output a quantized coefficient.

The entropy encoding module 150 may entropy-encode a symbol according to probability distribution based on values derived by the quantization module 140 or an encoding parameter value derived in encoding, thereby outputting a bitstream. Entropy encoding is a method of receiving symbols having different values and representing the symbols as a decodable binary sequence or string while removing statistical redundancy.

Here, a symbol means a syntax element as an encoding/decoding target, a coding parameter, a value of a residual signal, or the like. A coding parameter, which is a parameter necessary for encoding and decoding, may include information encoded by the encoding apparatus and transferred to the decoding apparatus, such as a syntax element, and information to be inferred during an encoding or decoding process and means information necessary for encoding and decoding a picture. The coding parameter may include, for example, values or statistics of an intra/inter prediction mode, a movement/motion vector, a reference picture index, a coding block pattern, presence and absence of a residual signal, a transform coefficient, a quantized transform coefficient, a block size and block partition information. A residual signal may denote a difference between an original signal and a prediction signal, a transformed signal of the difference between the original signal and the prediction signal, or a transformed and quantized signal of the difference between the original signal and the prediction signal. The residual signal may be referred to as a residual block in a block unit.

When entropy encoding is applied, a symbol having a high probability is allocated a small number of bits and a symbol having a low probability is allocated a large number of bits in representation of symbols, thereby reducing a size of bit strings for symbols to be encoded. Accordingly, entropy encoding may enhance compression performance of video encoding.

For entropy encoding, encoding methods, such as exponential Golomb, context-adaptive variable length coding (CAVLC) and context-adaptive binary arithmetic coding (CABAC), may be used. For example, a table used for performing entropy encoding, such as a variable length coding/code (VLC) table, may be stored in the entropy encoding module 150, and the entropy encoding module 150 may perform entropy encoding using the stored VLC table. In addition, the entropy encoding module 150 may derive a binarization method of a target symbol and a probability model of a target symbol/bin and perform entropy encoding using the derived binarization method or probability model.

The quantized coefficient may be dequantized by the dequantization module 160 and inversely transformed by the inverse transform module 170. The dequantized and inversely transformed coefficient is added to the prediction block by the adder 175, thereby generating a reconstructed block.

The reconstructed block is subjected to the filter module 180, and the filter module 180 may apply at least one of a deblocking filter, a sample adaptive offset (SAO), and an adaptive loop filter (ALF) to the reconstructed block or a reconstructed picture. The reconstructed block obtained via the filter module 180 may be stored in the reference picture buffer 190.

Figure 2:
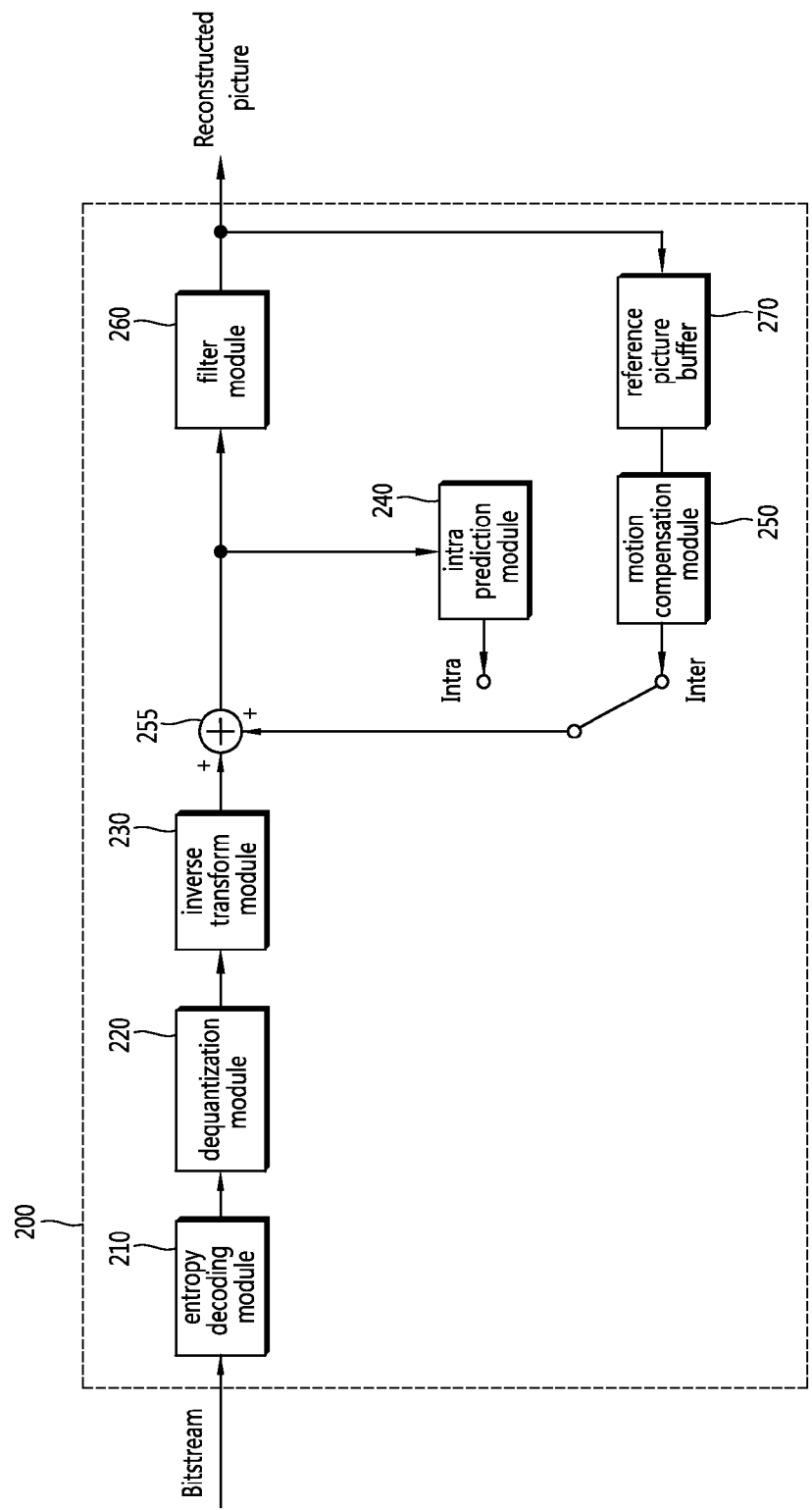
FIG. 2 is a block diagram illustrating a configuration of a video decoding apparatus according to an embodiment.

FIG. 2 is a block diagram illustrating a configuration of a video decoding apparatus according to an embodiment. As described above in FIG. 1, a scalable video encoding/decoding method or apparatus may be realized by extension of a general video encoding/decoding method or apparatus that does not provide scalability, and the block diagram of FIG. 2 illustrates an example of a video decoding apparatus which may form a basis for a scalable video decoding apparatus.

Referring to FIG. 2, the video decoding apparatus 200 includes an entropy decoding module 210, a dequantization module 220, an inverse transform module 230, an intra prediction module 240, a motion compensation module 250, a filter module 260, and a reference picture buffer 270.

The video decoding apparatus 200 receives an input bitstream output from the encoding apparatus and decodes the bitstream in an intra mode or inter mode to output a reconstituted picture, that is, a reconstructed picture. In the intra mode, a switch may be shifted to 'intra,' and in the inter mode, the switch may be shifted to 'inter. The video decoding apparatus 200 may obtain a residual block reconstructed from the input bitstream, generate a prediction block, and add the residual block and the prediction block to generate a reconstituted block, that is, a reconstructed block.

The entropy decoding module 210 may entropy-decode the input bitstream according to probability distribution to generate symbols including a symbol in a form of a quantized coefficient. Entropy decoding is a method of receiving a binary sequence to generate symbols. The entropy decoding method is similar to the aforementioned entropy encoding method.

The quantized coefficient is dequantized by the dequantization module 220 and inversely transformed by the inverse transform module 230, thereby generating a reconstructed residual block.

In the intra mode, the intra prediction module 240 may perform spatial prediction by using a pixel value of a pre-encoded block around a current block to generate a prediction block. In the inter mode, the motion compensation module 250 may perform motion compensation using a motion vector and a reference picture stored in the reference picture buffer 270, thereby generating a prediction block.

The reconstructed residual block and the prediction block are added by an adder 255, and the added blocks are subjected to the filter module 260. The filter module 260 may apply at least one of a deblocking filter, an SAO, and an ALF to the reconstructed block or the reconstructed picture. The filter module 260 outputs the reconstituted picture, that is, the reconstructed picture. The reconstructed picture may be stored in the reference picture buffer 270 to be used for inter prediction.

Among the entropy decoding module 210, the dequantization module 220, the inverse transform module 230, the intra prediction module 240, the motion compensation module 250, the filter module 260 and the reference picture buffer 270 of the decoding apparatus 200, components directly related to video decoding, for example, the entropy decoding module 210, the dequantization module 220, the inverse transform module 230, the intra prediction module 240, the motion compensation module 250 and the filter module 260 may be defined as a decoder or a decoding unit, separately from the other components.

Further, the decoding apparatus 200 may further include a parsing module (not shown) to parse information about an encoded video included in the bitstream. The parsing module may include the entropy decoding module 210 or be included in the entropy decoding module 210. The parsing module may be provided as one component of the decoding unit.

Figure 3:
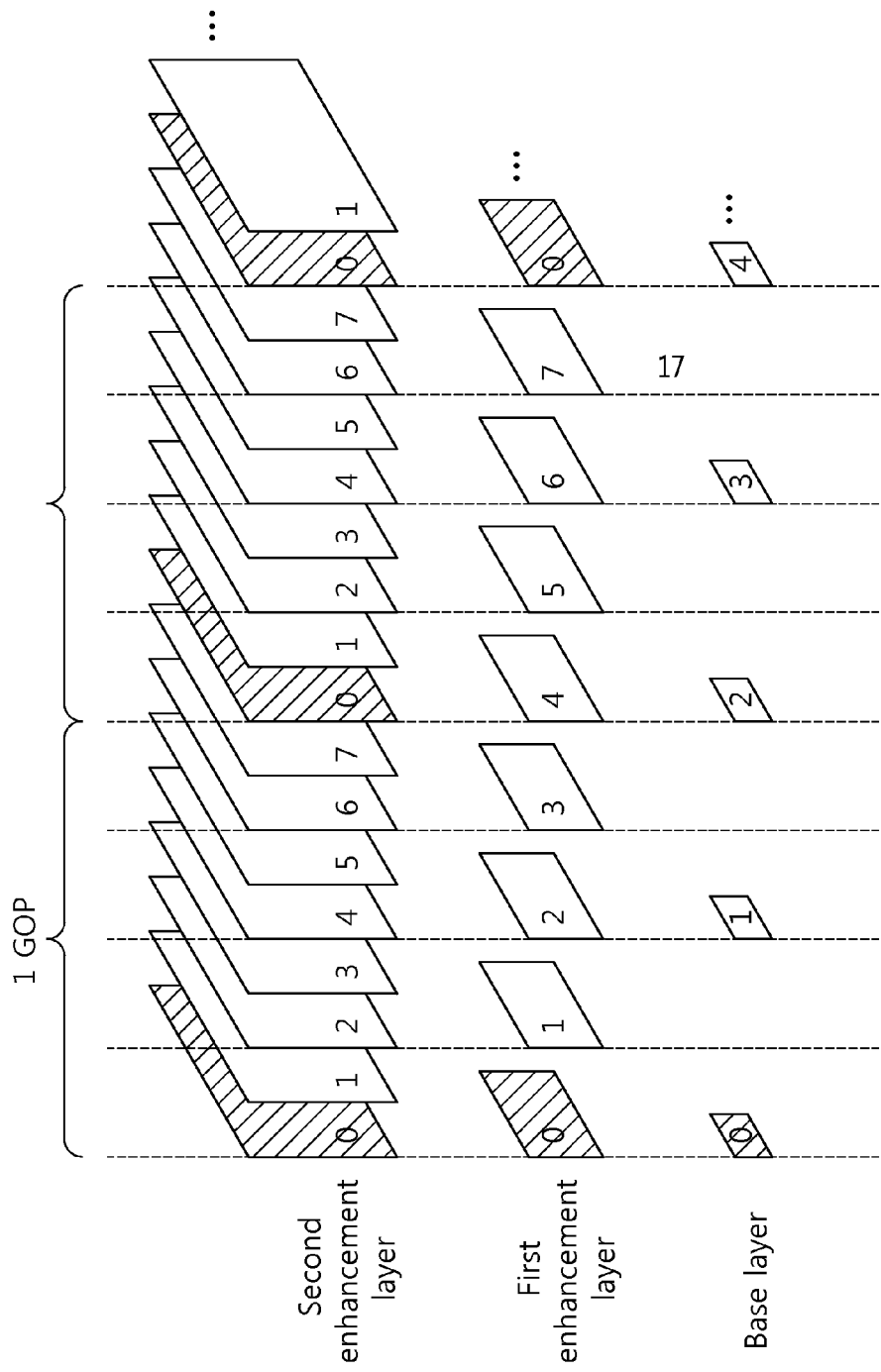
FIG. 3 is a conceptual diagram schematically illustrating a scalable video coding structure using a plurality of layers according to an embodiment of the present invention.

FIG. 3 is a conceptual diagram schematically illustrating a scalable video coding structure using a plurality of layers according to an embodiment of the present invention. In FIG. 3, Group of Picture (GOP) denotes a picture group, that is, a group of pictures.

In order to transmit video data, a transmission medium is needed, and performance thereof is different by each transmission medium according to various network environments. For application to various transmission media or network environments, a scalable video coding method may be provided.

The scalable video coding method is a coding method which utilizes texture information, motion information, residual signals between layers, or the like to remove redundancy between layers, thus improving encoding and decoding performance. The scalable video coding method may provide various scalabilities in spatial, temporal, quality and viewpoint aspects according to ambient conditions such as transmission bit rate, transmission error rate, and system resources.

Scalable video coding may be performed by using a multi-layer structure so as to provide a bitstream applicable to various network situations. For example, the scalable video coding structure may include a base layer in which video data is compressed and processed using a general video decoding method, and also include an enhancement layer in which video data is compressed and processed using both decoding information of the base layer and a general video decoding method.

Here, a layer refers to a set of pictures and bitstreams that are classified according to a spatial aspect (for example, picture size), a temporal aspect (for example, encoding order, picture output order and frame rate), picture quality, viewpoint, complexity, or the like. Further, the base layer may refer to a lower layer or a reference layer, and the enhancement layer may refer to a higher layer. A plurality of layers may have dependency on each other.

Referring to FIG. 3, for example, the base layer may be defined by standard definition (SD), 15 Hz frame rate and 1 Mbps bit rate, a first enhancement layer may be defined by high definition (HD), 30 Hz frame rate and 3.9 Mbps bit rate, and a second enhancement layer may be defined by 4K-ultra high definition (UHD), 60 Hz frame rate and 27.2 Mbps. These formats, frame rates and bit rates are provided only for illustrative purposes and may be changed and modified as needed. Also, a number of used layers may change depending on circumstances, without being limited to the present embodiment.

For instance, when a transmission bandwidth is 4 Mbps, the first enhancement layer HD may be transmitted at a frame rate reduced to 15 Hz or lower. The scalable video coding method may provide spatial, temporal, quality and viewpoint scalabilities using the method described above with reference to FIG. 3.

Scalable video coding may refer to scalable video encoding in encoding, and to scalable video decoding in decoding.

The present invention relates to a process of encoding/decoding a video including a plurality of layers or views, wherein the plurality of layers or views may be expressed as first, second, third and n-th layers or views. Although the following description will be made with reference to a picture including a first layer and a second layer, the same process may be applied to pictures including two or more layers or views. The first layer may be represented as a base layer, and the second layer as an upper layer. Further, the first layer may be also represented as a reference layer, and the second layer as an enhancement layer.

A picture/block in the first layer corresponding to a second-layer picture/block may be adjusted to a size of the second-layer picture/block. That is, if a size of the first-layer picture/block is smaller than the size of the second-layer picture/block, the first-layer picture/block may be scaled using up-sampling or re-sampling.

The first-layer picture may be added to a reference picture list for the second layer and used for encoding/decoding a second-layer video. Here, the second layer may be subjected to prediction and encoding/decoding using the first-layer picture in the reference picture list, as in general inter prediction.

A block for encoding/decoding may have a square shape with an N×N size, for example, 4×4, 8×8, 16×16, 32×32 and 64×64, or a rectangular shape with an N×M size, for example, 4×8, 16×8 and 8×32, and a block unit may be at least one of a coding block (CB), a prediction block (PB) and a transform block (TB), which may have different sizes.

Hereinafter, a method of generating a prediction block, that is, a prediction signal, of an encoding/decoding target block ("current block" or "target block") in an upper layer will be described in a method of encoding and decoding a scalable video, that is, a video using a multi-layer structure. The following method or apparatus may be generally applied to both an encoding apparatus and a decoding apparatus.

Meanwhile, according to a current draft of Scalable High Efficiency Video Coding (SHVC) and Multiview-High Efficiency Video Coding (MV-HEVC) standards, profile_tier_level specifying a profile, tier and level used for a layer set in a video parameter set (VPS) extension is described in Table 1.

TABLE 1

|  | Descriptor |
|---|---|
| vps_extension( ) { | |
| ... | |
|   vps_num_profile_tier_level_minus1 | u(6) |
|   for( i = 1; i <= | |
|   vps_num_profile_tier_level_minus1; i++ ) { | |
|     vps_profile_present_flag[ i ] | u(1) |
|     if( !vps_profile_present_flag[ i ] ) | |
|       profile_ref_minus1[ i ] | u(6) |
|     profile_tier_level( vps_profile_present_flag[ | |
|     i ], vps_max_sub_layers_minus1 ) | |
|   } | |

Referring to Table 1, a value specified by vps_num_profile_tier_level_minus1 indicates a number of profile_tier_level( ) syntax structures in a VPS.

vps_profile_presentflag[i] equal to 1 indicates that profile and tier information is present in an i-th profile_tier_level( ) syntax structure, and vps_profile_present_flag[i] equal to 0 indicates that the profile and tier information is not present in the i-th profile_tier_level( ) syntax structure but is inferred.

profile_ref minus1[i] indicates that the profile and tier information for the i-th profile_tier_level( ) sytanx structure is inferred to be equal to profile and tier information for a (profile_ref minus1[i]+1)-th profile_tier_level( ) syntax structure. Here, profile_ref minus1[i] plus 1 is less than or equal to i.

According to the current draft of the standards in Table 1, when i is 1 and vps_profile_present_flag[1] is 0, profile and tier information for a first profile_tier_level( ) syntax structure needs to be inferred from a (profile_ref minus1[1]+1)-th profile_tier_level( ) syntax structure. That is, profile_ref minus1[1]+1 is required to be 1 or 0. When profile_ref minus1[1]+1 is 0, profile_ref minus1[1] is −1, thus violating syntax definition of profile_ref minus1[i] encoded in u(6).

Further, when (profile_ref minus1[1]+1) is 1, a problem may occur that first profiled and tier information is required to be inferred from a first profile_tier_level syntax structure.

To address this problem, a restriction that vps_profile_present_flag[1] needs to be always 1 for a first profile_tier_level syntax structure is added to the semantics of the syntax. In this case, semantics of vps_profile_present_flag[i] in Table 1 may be expressed as follows.

vps_profile_present_flag[i] equal to 1 indicates that the profile and tier information is present in the i-th profile_tier_level( ) syntax structure, and vps_profile_present_flag[i] equal to 0 indicates that the profile and tier information is not present in the i-th profile_tier_level( ) syntax structure but is inferred. vps_profile_present_flag[1] for the first profile_tier_level syntax structure needs to be 1.

Alternatively, a signaling method illustrated in Table 2 may be considered to resolve the foregoing problem.

TABLE 2

| | Descriptor |
|---|---|
| vps_extension( ) { | |
|   ave_base_layer_flag | u(1) |
|   ... | |
|   vps_num_profile_tier_level_minus1 | u(6) |
|   for( i = 1; i <= vps_num_profile_tier_level_minus1; i ++ ) { | |
|     vps_profile_present_flag[ i ] | u(1) |
|     profile_tier_level( vps_profile_present_flag[ i ], vps_max_sub_layers_minus1 ) | |

TABLE 2-continued

| | Descriptor |
|---|---|
|   } | |
|   ... | |
| } | |

Referring to Table 2, a value specified by vps_num_profile_tier_level_minus1 indicates a number of profile_tier_level( ) syntax structures in a VPS.

vps_profile_present_flag[i] equal to 1 indicates that profile and tier information is present in an i-th profile_tier_level( ) syntax structure, and vps_profile_present_flag[i] equal to 0 indicates that the profile and tier information is not present in the i-th profile_tier_level( ) syntax structure but is inferred from profile and tier information on an (i−1)-th profile_tier_level( ) syntax structure. vps_profile_present_flag[1] for a first profile_tier_level syntax structure needs to be 1.

According to Table 2, profile_ref minus1[1] is not signaled.

Alternatively, syntax structures of the VPS may be modified so that even Media Aware Network Equipment (MANE) having no entropy decoder may parse the VPS extension. Tables 3 to 5 illustrate VPSs according to various embodiments of the present invention.

TABLE 3

| | Descriptor |
|---|---|
| video_parameter_set_rbsp( ) { | |
|   vps_video_parameter_set_id | u(4) |
|   vps_reserved_three_2bits | u(2) |
|   vps_max_layers_minus1 | u(6) |
|   vps_max_sub_layers_minus1 | u(3) |
|   vps_temporal_id_nesting_flag | u(1) |
|   vps_extension_offset //vps_reserved_0xffff_16bits | u(16) |
|   profile_tier_level(1, vps_max_sub_layers_minus1) | |
|   vps_sub_layer_ordering_info_present_flag | u(1) |
|   for(i=(vps_sub_layer_ordering_info_present_flag ? 0 : vps_max_sub_layers_minus1) ; i<= vps_max_sub_layers_minus1; i++){ | |
|     vps_max_dec_pic_buffering_minus1[ i ] | ue(v) |
|     vps_max_num_reorder_pics[ i ] | ue(v) |
|     vps_max_latency_increase_plus1[ i ] | ue(v) |
|   } | |
|   vps_max_layer_id | u(6) |
|   vps_num_layer_sets_minus1 | ue(v) |
|   for(i = 1 ; i<= vps_num_layer_sets_minus1 ; i++){ | |
|     for(j=0 : j<= vps_max_layer_id ; j++){ | |
|       layer_id_included_flag[ i ][ j ] | u(1) |
|   ... | |
|   vps_extension_flag | u(1) |
|   if(vps_extension_flag ) { | |
|     while (!byte_aligned( )) | |
|       vps_extension_alignment_bit_equal_to_one | u(1) |
|     vps_extension( ) | |
|     vps_extension2_flag | u(1) |
|     if(vps_extension2_flag) | |
|       while(more_rbsp_data( )) | |
|         vps_extension_data_flag | u(1) |
|   } | |
|   rbsp_trailing_bits( ) | |
| } | |

TABLE 4

| | Descriptor |
|---|---|
| vps_extension( ) { | |
|   ave_base_layer_flag | u(1) |
|   ... | |
|   vps_number_layer_sets_minus1 | u(10) |
|   vps_num_profile_tier_level_minus1 | u(6) |
|   for(i=1; i<=vps_num_profile_tier_level_minus1; i++){ | |
|     vps_profile_present_flag[ i ] | u(1) |
|     if(!vps_profile_present_flag[ i ]) | |
|       profile_ref_minus1[ i ] | u(6) |
|     profile_tier_level(vps_profile_present_flag[ i ], vps_max_sub_layers_minus1) | |
|   } | |
|   NumOutputLayerSets = vps_number_layer_sets_minus1 + 1 | |
|   more_output_layer_sets_than_default_flag | u(1) |
|   if(more_output_layer_sets_than_default_flag){ | |
|     num_add_output_layer_sets_minus1 | u(10) |
|     numOutputLayerSets += num_add_output_layer_sets_minus1 + 1 | |
|   } | |
|   if(numOutputLayerSets > 1) | |
|     default_one_target_output_layer_idc | u(2) |
|   for(i = 1 ; i<numOutputLayerSets ; i++){ | |
|     if(i>vps_number_layer_sets_minus1){ | |
|       output_layer_set_idx_minus1[ i ] | u(v) |
|       lsIdx = output_layer_set_idx_minus1[ i ] + 1 | |
|       for(j=0 ; j<NumLayersInIdList[lsIdx]−1 ; j++) | |
|         output_layer_flag[ i ][ j ] | u(1) |
|     } | |
|     profile_level_tier_idx[ i ] | u(v) |
|   } | |
| } | |

TABLE 5

| | Descriptor |
|---|---|
| vps_extension( ) { | |
|   avc_base_layer_flag | u(1) |
|   vps_vui_present_flag | u(1) |
|   if(vps_vui_present_flag) | |
|     vps_vui_offset | u(16) |
|   ... | u(1) |
|   all_ref_layers_active_flag | u(1) |
|   vps_maximum_layer_id | u(1) |
|   vps_num_layer_sets_minus1 | u(10) |
|   for(i=1; i<= vps_num_layer_sets_minus1 ; i++) | |
|     for(j=0 ; j<= vps_maximum_layer_id ; j++) | |
|       layer_id_nuh_included_flag[ i ][ j ] | u(1) |
|   vps_num_profile_tier_level_minus1 | u(6) |
|   for(i=1; i<=vps_num_profile_tier_level_minus1; i++){ | |
|     vps_profile_present_flag[ i ] | u(1) |
|     if(!vps_profile_present_flag[ i ]) | |
|       profile_ref_minus1[ i ] | u(6) |
|     profile_tier_level(vps_profile_present_flag[i ], vps_max_sub_layers_minus1) | |
|   } | |
|   NumOutputLayerSets = vps_number_layer_sets_minus1 + 1 | |
|   more_output_layer_sets_than_default_flag | u(1) |
|   if(more_output_layer_sets_than_default_flag){ | |
|     num_add_output_layer_sets_minus1 | u(10) |
|     numOutputLayerSets += num_add_output_layer_sets_minus1 + 1 | |
|   } | |
|   if(numOutputLayerSets > 1 ) | |
|     default_one_target_output_layer_idc | u(2) |
|   for(i=1 ; i< numOutputLayerSets ; i++){ | |
|     if(i>vps_number_layer_sets_minus1){ | |
|       output_layer_set_idx_minus1[ i ] | u(v) |
|       lsIdx = output_layer_set_idx_minus1[ i ] + 1 | |
|       for( j = 0; j <NumLayersInIdList[lsIdx ]−1 ; j++) | |
|         output layer flag[ i ][ j ] | u(1) |
|     } | |
|     profile_level_tier_idx[ i ] | u(v) |
|   } | |

TABLE 5-continued

| | Descriptor |
|---|---|
| ... | |
| } | |

Referring to Table 3, vps_extension_offset transmitted via a VPS specifies a byte offset from a start point of a VPS NAL unit to fixed length coded information starting with syntax avc_base_layer_flag.

The byte offset defined by vps_extension_offset enables access to pieces of basic information in the VPS NAL unit which does not need entropy decoding and enables session negotiations.

For example, the MANE having no entropy decoder may parse pieces of basic information not needing entropy decoding to use for session negotiations based on the byte offset value specified by vps_extension_offset.

When the MANE having no entropy decoder parses output layer sets information in a VPS extension of Table 4 based on vps_extension_offset information for session negotiations without entropy-decoding information after vps_extension_offset, NumLayersInIdList as a variable specifying a number of layers in a layer identifier (ID) list needs to be entropy-decoded as a value calculated from information on layer sets specified after vps_extension_offset in Table 3, that is, layer_id_included_flag[i][j].

To make the output layer sets information in the VPS extension available for session negotiations without entropy decoding, information on layer sets may be specified in a VPS extension of Table 5.

Meanwhile, semantics of syntax elements relating to the layer sets specified in the VPS extension of Table 5 are as follows.

vps_maximum_layer_id, which is the same as vps_max_layer_id specified in the VPS, specifies a maximum allowed value of nuh_layer_id of all NAL units in a coding video sequence (CVS) and may have the same value as vps_max_layer_id described in the VPS.

vps_number_layer_sets_minus1 specifies a number of layer sets and may be signaled prior to vps_vui_offset.

Similar to layer_id_included_flag[i][j] specified in the VPS, layer_id_nuh_included_flag[i][j] equal to 1 indicates that a value of nuh_layer_id equal to j is included in a layer identifier list, layerSetLayerIdList[i], and layer_id_nuh_included_flag[i][j] equal to 0 indicates that the value of nuh_layer_id equal to j is not included in layerSetLayerIdList[i]. layer_id_nuh_included_flag[i][j] is required to have the same value as layer_id_included_flag[i][j] specified in the VPS.

numLayersInIdList[i] and layerSetLayerIdList[i] may be obtained as follows, i being in a range of 1 to vps_number_layer_sets_minus1.

```
n=0
for ( m = 0; m <= vps_maximum_layer_id; m++)
    if (layer_id_nuh_included_flag[i][m])
        layerSetLayerIdList[i][n++] = m
numLayersInIdList[i] = n
```

In multilayer-based video encoding and decoding methods, on the basis of layer_id_nuh_included_flag[i][j] specified in the VPS extension, a VPS video usability information (VUI) bitstream partition hypothetical reference decoder (HRD) parameter syntax, a bitstream partition HRD parameter supplemental enhancement information (SEI) message syntax and the like are specified or layer sets relating information is interpreted.

Alternatively, information on layers sets may be specified in a VPS extension of Table 6.

TABLE 6

|  | Descriptor |
|---|---|
| vps_extension( ) { | |
|   avc_base_layer_flag | u(1) |
|   vps_maximum_layer_id | u(1) |
|   vps_num_layer_sets_minus1 | u(10) |
|   for(i=1 ; i<= vps_number_layer_sets_minus1 ; i++) | |
|     for(j=0 ; j<= vps_maximum_layer_id ; j++) | |
|       layer_id_nuh_included_flag[ i ][ j ] | u(1) |
|   for(i=1 ; i<= MaxLayersMinus1 ; i++) | |
|     for(j=0 ; j<i ; j++) | |
|       direct_dependency_flag [ i ][ j ] | u(1) |
|   vps_vui_present_flag | u(1) |
|   if(vps_vui_present_flag ) | |
|     vps_vui_offset | u(16) |
|   splitting_flag | u(1) |
|   for(i=0; NumScalabilityTypes=0 ; i<16 ; i++){ | |
|     scalability_mask_flag[ i ] | u(1) |
|     NumScalabilityTypes += scalability_mask_flag[ i ] | |
|   } | |
|   for(j=0 ; j<(NumScalabilityTypes−splitting_flag) ; j++) | |
|     dimension_id_len_minus1[ j ] | u(3) |
|   vps_nuh_layer_id_present_flag | u(1) |
|   ... | |
| } | |

Table 6 illustrates the information on the layer sets in the VPS extension, wherein session negotiations may be performed, without entropy decoding, using the output layer sets information in the VPS extension.

Layer sets relating syntax elements, vps_maximum_layer_id, vps_number_layer_sets_minus1 and layer_id_nuh_included_flag[i][j], may be specified prior to vps_vui_offset.

In addition, direct_dependency_flag indicating dependency between layers may be repositioned before vps_vui_ffset. In this case, vps_vui information may be identified using vps_vui_offset without parsing a syntax element after vps_vui_offset.

Alternatively, information on layer sets may be specified in a VPS extension of Table 7.

TABLE 7

|  | Descriptor |
|---|---|
| video_parameter_set_rbsp( ) { | |
|   vps_video_parameter_set_id | u(4) |
|   vps_reserved_three_2bits | u(2) |
|   vps_max_layers_minus1 | u(6) |
|   vps_max_sub_layers_minus1 | u(3) |
|   vps_temporal_id_nesting_flag | u(1) |
|   vps_max_layer_id | u(6) |
|   vps_num_layer_sets_minus1 | u(10) |
|   for(i=1 ; i<= vps_num_layer_sets_minus1; i++ ){ | |
|     for(j=0 ; j<= vps_max_layer_id ; j++){ | |
|       layer_id_included_flag[ i ][ j ] | u(1) |
|   vps_extension_offset // vps_reserved_0xffff_16bits | u(16) |
|   profile_tier_level(1, vps_max_sub_layers_minus1) | |
|   vps_sub_layer_ordering_info_present_flag | u(1) |
|   for(i=(vps_sub_layer_ordering_info_present_flag ? 0 : | |
|     vps_max_sub_layers_minus1 ) ; i<= vps_max_sub_layers | |
|     _minus1; i++){ | |
|     vps_max_dec_pic_buffering_minus1[ i ] | ue(v) |
|     vps_max_num_reorder_pics[ i ] | ue(v) |
|     vps_max_latency_increase_plus1[ i ] | ue(v) |
|   } | |
|   vps_timing_info_present_flag | u(1) |

Referring to Table 7, layer sets relating syntax elements in the VPS may be positioned prior to vps_extension_offset.

vps_num_layer_sets_minus1, which is conventionally encoded in variable bit ue(V), may be encoded in fixed bit u(10) to avoid entropy decoding, and vps_number_layer_sets_minus1 having the same function specified in the VPS extension may be deleted.

Meanwhile, video signaling information specified in VPS VUI is available for session negotiations, and the VPS VUI may be described in Table 8.

TABLE 8

|  | Descriptor |
|---|---|
| vps_vui( ){ | |
|   cross_layer_pic_type_aligned_flag | u(1) |
|   if(!cross_layer_pic_type_aligned_flag) | |
|     cross_layer_irap_aligned_flag | u(1) |
|   bit_rate_present_vps_flag | u(1) |
|   pic_rate_present_vps_flag | u(1) |
|   ... | |
|   ilp_restricted_ref_layers_flag | u(1) |
|   if(ilp_restricted_ref_layers_flag) | |
|     for(i=1 ; i<=MaxLayersMinus1 ; i++) | |
|       for(j=0 ; j<=NumDirectRefLayers[ layer_id_in_nuh[ i ]] ; j++){ | |
|         min_spatial_segment_offset_plus1[ i ][ j ] | ue(v) |
|         if(min_spatial_segment_offset_plus1[ i ][ j ]>0){ | |
|           ctu_based_offset_enabled_flag[ i ][ j ] | u(1) |
|           if(ctu_based_offset_enabled_flag[ i ][ j ] ) | |
|             min_horizontal_ctu_offset_plus1[ i ][ j ] | ue(v) |
|         } | |
|       } | |
|   video_signal_info_idx_present_flag | u(1) |
|   if(video_signal_info_idx_present_flag ) | |
|     vps_num_video_signal_info_minus1 | u(4) |

TABLE 8-continued

| | Descriptor |
|---|---|
| for(i=0 ; i<= vps_num_video_signal_info_minus1 ; i++) | |
|     video signal info( ) | |
| if(video_signal_info_idx_present_flag && vps_num_video_signal_info_minus1 > 0) | |
|     for(i=1 ; i<= MaxLayersMinus1 ; j++) | |
|         vps_video_signal_info_idx[ i ] | u(4) |
| ... | |
| } | |

Referring to Table 8, video_signal_info_idx_present_flag equal to 1 indicates that vps_num_video_signal_info_minus1 and vps_video_signal_info_idx[i] are present, and video_signal_info_idx_present_flag equal to 0 indicates that vps_num_video_signal_info_minus1 and vps_video_signal_info_idx[i] are absent.

vps_num_video_signal_info_minus1 plus 1 indicates a number of video_signal_info( ) syntax structures in a VPS. In the absence of vps_num_video_signal_info_minus1, a number of vps_num_video_signal_info_minus1 is inferred to be equal to a MaxLayersMinus1 value.

vps_video_signal_info_idx indicates an index of a video_signal_info( ) syntax structure list applied to a layer having nuh_layer_id equal to layer_id_in_nuh[i]. In the absence of vps_video_signal_info_idx, vps_video_signal_info_idx[i] is inferred as (video_signal_info_idx_present_ flag ? 0:i). vps_video_signal_info_idx[i] may be in a range of 0 to vps_num_video_signal_info_minus1.

In the current draft of the SHVC and MV-HEVC standards, since syntax elements encoded in exponential-Golomb code (ue(v)) are present before video signaling information as in Table 8, the MANE having no entropy decoder may be unable to use the video signaling information for session negotiations.

To solve such a problem, that is, to use the video signaling information in the VPS VUI for session negotiations without entropy decoding, the video signaling information may be specified at a position accessible without entropy decoding in Table 9.

TABLE 9

| | Descriptor |
|---|---|
| vps_vui( ) { | |
|   cross_layer_pic_type_aligned_flag | u(1) |
|   if(!cross_layer_pic_type_aligned_flag) | |
|     cross_layer_irap_aligned_flag | u(1) |
|   bit_rate_present_vps_flag | u(1) |
|   pic_rate_present_vps_flag | u(1) |
|   if(bit_rate_present_vps_flag || pic_rate_present_vps_flag) | |
|     for(i=0 ; i<=vps_num_layer_sets_minus1 ; j++) | |
|       for( j=0 ; j<=vps_max_sub_layers_minus1 ; j++) | |
|         if(bit_rate_present_vps_flag) | |
|           bit_rate_present_flag[ i ][ j ] | u(1) |
|         if(pic_rate_present_vps_flag) | |
|           pic_rate_present_flag[ i ][ j ] | u(1) |
|         if(bit_rate_present_flag[ i ][ j ]){ | |
|           avg_bit_rate[ i ][ j ] | u(16) |
|           max_bit_rate[ i ][ j ] | u(16) |
|         } | |
|         if(pic_rate_present_flag[ i ][ j ]){ | |
|           constant_pic_rate_idc[ i ][ j ] | u(2) |
|           avg_pic_rate[ i ][ j ] | u(16) |
|         } | |
|     } | |
|   video_signal_info_idx_present_flag | u(1) |
|   if(video_signal_info_idx_present_flag) | |
|     vps_num_video_signal_info_minus1 | u(4) |

TABLE 9-continued

| | Descriptor |
|---|---|
|   for(i=0 ; i<= vps_num_video_signal_info_minus1 ; i++) | |
|     video_signal_info( ) | |
|   if(video_signal_info_idx_present_flag && vps_num_video_signal_info_minus1>0) | |
|     for(i=1 ; i<= MaxLayerMinus1 ; i++) | |
|       vps_video_signal_info_idx[ i ] | u(4) |

As in Table 9, to access the video signaling information without entropy decoding, syntax elements relating to the video signaling information may be described in VPS_VUI following syntax elements relating to bit_rate and pic_rate, such as bit_rate_present_vps_flag, pic_rate_present_vps_flag, bit_rate_present_flag and pic_rate_present_flag.

That is, flag information indicating presence of a signal indicating a number of pieces of video signaling information video_signal_info and an index of video signaling information, that is, video_signal_info_idx_present_flag, is received following signals signaled using fixed bits, thereby accessing the video signaling information without entropy decoding.

Meanwhile, an aspect of the present invention suggests various methods for acquiring a number of active reference layer pictures used to decode a current picture for interlayer prediction.

First Method

NumActiveRefLayerPics, a variable specifying a number of active reference layer pictures used to decode a current picture for interlayer prediction, may be obtained as follows. According to a first method, all slices of a picture are defined to have the same NumActiveRefLayerPics value.

(1) If nuh_layer_id as a layer ID of a layer including a current picture is 0 or NumDirectRefLayers as a number of direct reference layers of the layer including the current picture is 0, NumActiveRefLayerPics may be set equal to 0. That is, if the layer is a base layer or the number of direct reference layers is 0, the number of active reference layer pictures used to decode the current picture is set equal to 0.

(2) Otherwise, if all_ref_layers_active_flag specified in a VPS extension is 1, NumActiveRefLayerPics may be set equal to a numRefLayerPics value obtained by Equation 1, Equation 2 or Equation 3.

all_ref_layers_active_flag equal to 1 indicates that for each picture referring to the VPS, the direct reference layer pictures that belong to all direct reference layers of the layer containing the picture, and that may be used for inter-layer prediction as specified by the values of sub_layers_vps_max_minus1[i] and max_tid_il_ref_pics_plus1 [i][j] are present in the same access unit as the picture and are included in the inter-layer reference picture set of the picture.

all_ref_layers_active_flag equal to 0 indicates that the foregoing restriction may be applied or not be applied.

all_ref_layers_active_flag may also be expressed as default ref_layers_active_flag.

numRefLayerPics, a variable indicating a number of reference layer pictures in the same AU unit as that of the current picture which are available for interlayer prediction may be derived as follows.

< Equation 1>

```
for(i=0, j=0; i<NumDirectRefLayers[nuh_layer_id]; i++){
    refLayerIdx = LayerIdxInVps[RefLayerId[nuh_layer_id][i]]
    if((sub_layers_vps_max_minus1[refLayerIdx]>=TemporalId)&&
        ( max_tid_il_ref_pics_plus1[refLayerIdx][LayerIdxInVps
        [nuh_layer
        _id]]>TemporalId))
            refLayerPicIdc[j++] = i
}
numRefLayerPics = j
```

Referring to Equation 1, variable NumDirectRefLayers[ ] specifies a number of direct reference layers of a current layer, calculated from direct_dependency_flag dpsecified in the VPS extension.

sub_layers_vps_max_minus1[i] specifies maximum temporal sub-layer information on each layer, max_tid_il_ref_pics_plus1[i][j] specifies maximum allowed value of temporal sub-layer allowing inter-layer prediction in each layer, and TemporalId specifies a temporal level of the current picture.

According to Equation 1, among the direct reference layers of the layer including the current picture, only pictures in a reference layer with sub_layers_vps_max_minus1[i] greater than or equal to TemporalId of the current picture and with 'max_tild_il_ref_pics_plus1[i][j] for a current layer greater than TemporalId of the current picture may be considered as direct reference layer pictures available for decoding the current picture for interlayer prediction.

Meanwhile, when max_tid_il_ref_pics_plus1[i][j] is 0, a non-intra random access point (non-IRAP) picture with nuh_layer_id equal to layer_id_in_nuh[i] is unavailable as a reference picture for interlayer prediction for a picture with nuh_layer_id equal to layer_id_in_nuh[j]. To apply such a restriction, Equation 1 may be replaced with < Equation 2>

```
for(i=0, j=0 ; i<NumDirectRefLayers[nuh_layer_id]; i++){
    refLayerIdx = LayerIdxInVps[RefLayerId[nuh_layer_id][i]]
    refLayerPicFlag = ((sub_layers_vps_max_minus1[refLayerIdx]>=TemporalId)&&
((max_tid_il_ref_pics_plus1[refLayerIdx][LayerIdxInVps[nuh_layer_id]]==0?(max_tid_il_ref_pics_plus1[refLayerIdx][LayerIdxInVps
[nuh_layer_id ] ]==TemporalId) :
(max_tid_il_ref_pics_plus1[refLayerIdx][LayerIdxInVps[nuh_layer_id]]>TemporalId)))
    if(refLayerPicFlag)
            refLayerPicIdc[j++] = i
    }
    numRefLayerPics = j
```

In Equation 2, variable NumDirectRefLayers[ ] specifies a number of direct reference layers of a current layer, calculated from direct_dependency_flag specified in the VPS extension.

sub_layers_vps_max_minus1[i] specifies maximum temporal sub-layer information on each layer, max_tid_il_ref_pics_plus1[i][j] specifies maximum allowed value of temporal sub-layer allowing inter-layer prediction in each layer, and TemporalId specifies a temporal level of the current picture.

According to Equation 2, when max_tid_il_ref_pics_plus1[i][j] is 0, only pictures in a reference layer with max_tid_il_ref_pics_plus1[i][j] of 0 equal to TemporalId of the current picture and with sub_layers_vps_max_minus1[i] greater than or equal to TemporalId of the current picture, among the direct reference layers of the layer including the current picture, may be considered as reference layer pictures available for decoding the current picture for interlayer prediction. In this case, the pictures in the reference layer may be restricted to IRAP pictures.

When max_tid_il_ref_pics_plus1[i][j] is greater than 0, only pictures in a reference layer with sub_layers_vps_max_minus1[i] of a reference layer greater than or equal to TemporalId of the current picture and with max_tild_il_ref_pics_plus1[i][j] of a reference layer greater than TemporalId of the current picture may be considered as reference layer pictures available for decoding the current picture for interlayer prediction.

Alternatively, when max_tid_il_ref_pics_plus1[i][j] is 0, a non-IRAP picture with nuh_layer_id equal to layer_id_in_nuh[i] is unavailable as a reference picture for interlayer prediction for a picture with nuh_layer_id equal to layer_id_in_nuh[j]. To apply such a restriction, Equation 1 may be replaced with Equation 3.

< Equation 3>

```
for(i=0, j=0 ; i<NumDirectRefLayers[nuh_layer_id]; i++){
    refLayerIdx = LayerIdxInVps[RefLayerId[nuh_layer_id][i]]
    if((sub_layers_vps_max_minus1[refLayerIdx]>=TemporalId&&
        (max_tid_il_ref_pics_plus1[refLayerIdx][LayerIdxInVps[
        nuh_layer_id]]>TemporalId || TemporalId==0))
            refLayerPicIdc[j++] = i
}
numRefLayerPics = j
```

In Equation 3, variable NumDirectRefLayers[ ] specifies a number of direct reference layers of a current layer, calculated from direct_dependency_flag specified in the VPS extension.

sub_layers_vps_max_minus1[i] specifies maximum temporal sub-layer information on each layer, max_tid_il_ref_pics_plus1[i][j] specifies maximum allowed value of temporal sub-layer allowing inter-layer prediction in each layer, and TemporalId specifies a temporal level of the current picture.

According to Equation 3, only when sub_layer_vps_max_minus1[i] of a reference layer is greater than or equal to TemporalId of the current picture which is 0 or max_tid_il_ref_pics_plus1[i][j] of the reference layer is greater than TemporalId of the current picture, pictures in the reference layer may be considered as reference layer pictures available for decoding the current picture.

(3) Otherwise, if inter_layer_pred_enabled_flag specified in a slice segment header of the current picture is 0, NumActiveRefLayerPics may be set equal to 0. inter_layer_pred_enabled_flag indicates whether interlayer prediction is used for decoding the current picture.

(4) Otherwise, if max_one_active_ref layer_flag specified in the VPS is 1 or NumDirectRefLayers as the number of direct reference layers of the layer including the current picture is 1 and variable numRefLayerPics calculated by Equation 1, Equation 2 or Equation 3 is greater than 0, NumActiveRefLayerPics may be set equal to 1. If numReflLayerPics obtained from Equation 1, Equation 2 or Equation 3 is 0, NumActiveRefLayerPics may be set equal to 0. max_one_active_ref layer_flag equal to 1 indicates that at most one picture is used for interlayer prediction of each picture in a coding video sequence, and max_one_active_ref layer_flag equal to 0 indicates that one or more pictures are used for interlayer prediction.

(5) If conditions (1) to (4) are not satisfied, NumActiveRefLayerPics may be set equal to num_inter_layer_ref_pics_minus1, transmitted via the slice segment header, plus 1.

(6) When nuh_layer_id of the layer is k and TemporalId of a temporal sub-layer ID is m, numRefLayerPics in (1) to (5) may be expressed as numRefLayerPics[k][m], which may be calculated by Equation 4 or Equation 5.

Equation 1 for deriving, in a VPS level, numRefLayerPics indicating a number of reference layer pictures available for decoding a sub-layer picture of each layer for all layers included in a bitstream may be replaced with Equation 4 or Equation 5. In this case, numRefLayerLayerPics may be replaced with numRefLayerPics[nuh_layer_id] [TemporalId].

sub_layers_vps_max_minus1[i] specifies maximum temporal sub-layer information on each layer, max_tid_il_ref_pics_plus1[i][j]' specifies maximum allowed value of temporal sub-layer allowing inter-layer prediction in each layer, and vps_max_sub_layers_minus1 specifies maximum number of temporal sub-layers that may be presented in all layers specified in the VPS.

In Equation 4, layer_id_in_nuh of reference layer pictures refers to nuh_layer_id present in a VCL NAL unit header.

According to Equation 4, it is determined which sub-layer is used as a reference layer from a direct reference layer among sub-layers having a tid (Temporal) value of 0 to vps_max_sub_layers_minus1 with respect to each layer (0~vps_max_layers_minus1) in a high level (for example, VPS).

As a result, in the presence of a referable sub-layer, layer_id_in_nuh of the sub-layer may be applied to RefLayerIdListForTid[[lId][tId][k++]. numRefLayerPics[lId][tId] specifies a number of referable sub-layers of a sub-layer with a tId value with respect to an lId layer.

Regarding the presence of a referable sub-layer, when sub_layers_vps_max_minus1[ ] of a reference layer is greater than or equal to TemporalId(tId) of the current picture and max_tild_il_ref_pics_plus1[ ][ ] of the reference layer is greater than TemporalId(tId) of the current picture which is 0, only pictures in the reference layer may be determined as reference layer pictures available for decoding the current picture for interlayer prediction.

< Equation 4>

```
for(lIdx=0 ; lIdx<=MaxLayersMinus1 ; lIdx++){
    lId = layer_id_in_nuh[lIdx]
    for(tId=0 ; tId<=vps_max_sub_layers_minus1 ; tId++){
        for(rCnt=0, k=0 ; rCnt<NumDirectRefLayers[lId]; rCnt++){
            refLayerIdx=LayerIdxInVps[RefLayerId[lId][rCnt]]
                if((sub_layers_vps_max_minus1[refLayerIdx]>=tId &&
        (max_tid_il_ref_pics_plus1[refLayerIdx][lIdx]>tId || tId==0))
                    RefLayerIdListForTid[lId][tId][k++]=RefLayerId[lId]
                    [rCnt]
        }
        numRefLayerPics[lId][tId] = k
    }
}
```

Equation 4, variable NumDirectRefLayers[ ] specifies a number of direct reference layers of a current layer, calculated from direct_dependency_flag specified in the VPS extension.

<Equation 5>

```
for(lIdx=0 ; lIdx<=MaxLayersMinus1 ; lIdx++){
    lId = layer_id_in_nuh[lIdx]
    for(tId=0 ; tId<=sub_layers_vps_max_minus1[lIdx] ; tId++){
        for(rCnt=0, k=0 ; rCnt<NumDirectRefLayers[lId]; rCnt++){
            refLayerIdx=LayerIdxInVps[RefLayerId[lId][rCnt]]
            if((sub_layers_vps_max_minus1[refLayerIdx]>=tId &&
                (max_tid_il_ref_pic_plus1[refLayerIdx][lIdx]>tId || tId==0))
                RefLayerIdListForTid[lId][tId][k++]=RefLayerId[lId][rCnt]
```

<Equation 5>

```
        }
        numRefLayerPics[lId][tId] = k
    }
}
```

In Equation 5, variable NumDirectRefLayers[ ] specifies a number of direct reference layers of a current layer, calculated from direct_dependency_flag specified in the VPS extension.

sub_layers_vps_max_minus1[i] specifies maximum temporal sub-layer information on each layer, and max_tid_il_ref_pics_plus1[i][j] specifies maximum allowed value of temporal sub-layer allowing inter-layer prediction in each layer.

In Equation 5, layer_id_in_nuh of reference layer pictures refers to nuh_layer_id present in a VCL NAL unit header.

According to Equation 5, it is determined which sub-layer is used as a reference layer from a direct reference layer among sub-layers having a tid (Temporal) value of 0 to sub_layers_vps_max_minus1 of maximum temporal sub-layer of each layer with respect to each layer (0~vps_max_layers_minus1) in a high level (for example, VPS).

As a result, in the presence of a referable sub-layer, layer_id_in_nuh of the sub-layer may be applied to RefLayerIdListForTid[[lId][tId][k++]. numRefLayerPics[lId][tId] specifies a number of referable sub-layers of a sub-layer with a tId value with respect to an lId layer.

Regarding the presence of a referable sub-layer, when sub_layers_vps_max_minus1 [ ] of a reference layer is greater than or equal to TemporalId(tId) of the current picture and max_tild_il_ref_pics_plus1[ ][ ] of the reference layer is greater than TemporalId(tId) of the current picture which is 0, only pictures in the reference layer may be determined as reference layer pictures available for decoding the current picture for interlayer prediction.

Second Method

NumActiveRefLayerPics, a number of active reference layer pictures used to decode a current picture for interlayer prediction, may be derived as follows. All slices of a picture are defined to have the same NumActiveRefLayerPics.

(1) If nuh_layer_id of a layer including the current picture is 0 or numRefLayerPics obtained by Equation 1, Equation 2 or Equation 3 is 0, NumActiveRefLayerPics may be set equal to 0.

(2) Otherwise, if all_ref_layers_active_flag specified in a VPS is 1, NumActiveRefLayerPics may be set equal to numRefLayerPics obtained by Equation 1, Equation 2 or Equation 3.

(3) Otherwise, if inter_layer_pred_enabled_flag specified in a slice segment header of the current picture is 0, NumActiveRefLayerPics may be set equal to 0.

(4) Otherwise, if max_one_active_ref layer_flag specified in the VPS is 1 or NumDirectRefLayers specifying a number of direct reference layers of the layer including the current picture is 1, NumActiveRefLayerPics may be set equal to 1.

(5) If conditions (1) to (4) are not satisfied, NumActiveRefLayerPics may be set equal to num_inter_layer_ref_pics_minus1, transmitted via the slice segment header, plus 1.

(6) If nuh_layer_id of the layer is k and TemporalId of a temporal sub-layer ID is m, numRefLayerPics in (1) to (5) may be expressed as numRefLayerPics[k][m], which may be derived by Equation 4 Equation 5.

Third Method

Alternatively, NumActiveRefLayerPics, a number of active reference layer pictures used to decode a current picture for interlayer prediction, may be derived as follows. All slices of a picture are defined to have the same NumActiveRefLayerPics.

(1) If nuh_layer_id of a layer including the current picture is 0 or numRefLayerPics obtained by Equation 1, Equation 2 or Equation 3 is 0, NumActiveRefLayerPics may be set equal to 0.

(2) Otherwise, if all_ref_layers_active_flag specified in a VPS is 1, NumActiveRefLayerPics may be set equal to numRefLayerPics obtained by Equation 1, Equation 2 or Equation 3.

(3) Otherwise, if inter_layer_pred_enabled_flag specified in a slice segment header of the current picture is 0, NumActiveRefLayerPics may be set equal to 0.

(4) Otherwise, if max_one_active_ref layer_flag specified in the VPS is 1 or numRefLayerPics obtained by Equation 1, Equation 2 or Equation 3 is 1, NumActiveRefLayerPics may be set equal to 1.

(5) If conditions (1) to (4) are not satisfied, NumActiveRefLayerPics may be set equal to num_inter_layer_ref_pics_minus1, transmitted via the slice segment header, plus 1.

(6) If nuh_layer_id of the layer is k and TemporalId of a temporal sub-layer ID is m, numRefLayerPics in (1) to (5) may be expressed as numRefLayerPics[k][m], which may be derived by Equation 4 or Equation 5.

Meanwhile, when numRefLayerPics indicating a number of reference layer pictures available to decode the current picture for interlayer prediction is derived using NumDirectRefLayers[ ] specifying a number of direct reference layers of a current layer, sub_layers_vps_max_minus1[i] indicating maximum temporal sub-layer information on each layer, max_tid_il_ref_pics_plus1[i][j] indicating maximum allowed value of temporal sub-layer allowing inter-layer prediction in each layer, and TemporalId as temporal information on the current picture, calculated from syntax elements specified in the VPS extension, a slice segment header signaling pieces of information on pictures used for interlayer prediction may be described in Table 10.

TABLE 10

| | Descriptor |
|---|---|
| slice_segment_header( ) { <br>    ... <br>    if(nuh_layer_id>0 && !all_ref_layers_active_flag && <br>       numRefLayerPics>0){ <br>          inter_layer_pred_enabled_flag | u(1) |
|          if(inter_layer_pred_enabled_flag && numRefLayer <br>          Pics>1){ <br>             if (!max_one_active_ref_layer_flag) <br>                num_inter_layer_ref_pics_minus1 | u(v) |
|             if(NumActiveRefLayerPics != numRefLayerPics) <br>                for(i=0; i< NumActiveRefLayerPics; i++) <br>                   inter_layer_pred_layer_idc[ i ] | u(v) |
|          } <br>    } <br>    ... <br>    if( sample_adaptive_offset_enabled_flag){ <br>       slice_sao_luma_flag | u(1) |
|       slice_sao_chroma_flag | u(1) |
|    } <br>    ... <br> } | |

Referring to Table 10, only when nuh_layer_id is greater than 0, all_ref_layers_active_flag specified in the VPS extension is 0 and numRefLayerPics derived by Equation 1 or 2 is greater than 0, inter-layer_pred_enabled_flag as interlayer reference picture information may be signaled.

Also, only when inter_layer_pred_enabled_flag is 1 and numRefLayerPics is greater than 1, num_inter_layer_ref_pics_minus1 indicating a number of interlayer reference pictures and inter_layer_pred_layer_idc[i] indicating an interlayer reference picture may be signaled.

Under the foregoing conditions, when max_one_active_ref_layer_flag specified in the VPS extension is 1, num_inter_layer_ref_pics_minus1 indicating the number of interlayer reference pictures may not be signaled.

Under the foregoing conditions, when NumActiveRefLayerPics is equal to numRefLayerPics, inter_layer_pred_layer_idc[i] indicating the interlayer reference picture may not be signaled.

inter_layer_pred_layer_idc[i] may have a value in a range of 0 to NumDirectRefLayers−1 of the layer including the current picture, and inter_layer_pred_layer_idc[i] may be inferred to be equal to refLayerPicIdc[i] derived by Equation 1 or 2 if not signaled.

Here, information on an active reference layer picture available for decoding the current picture may be derived by Equation 6. nuh_layer_id is nuh_layer_id of the current picture, and RefLayerId[ ][ ] is layer_id_in_nuh[ ] of a reference layer.

< Equation 6> for(i=0, j=0; i<NumActiveRefLayerPics; i++)
   RefPicLayerId[i] = RefLayerId[nuh_layer_id][inter_layer_pred_layer_idc[i]]

Alternatively, when numRefLayerPics is derived using Equation 4 or Equation 5, a slice segment header signaling pieces of information on pictures used for interlayer prediction may be described in Table 11.

In Table 11, nuh_layer_id is a layer ID specified in an NAL header of a current decoding target picture, and TemporalId is temporal information on the current decoding target picture, that is, sub-layer layer information.

TABLE 11

| | Descriptor |
|---|---|
| slice_segment_header( ) { <br>    ... <br>    if(nuh_layer_id>0 && !all_ref_layers_active_flag && <br>       numRefLayerPics[nuh_layer_id][TemporalId]>0){ <br>          inter_layer_pred_enabled_flag | u(1) |
|          if(inter_layer_pred_enabled_flag && <br>             numRefLayerPics[nuh_layer_id][TemporalId]>1){ <br>             if(!max_one_active_ref_layer_flag) <br>                num_inter_layer_ref_pics_minus1 | u(v) |
|             if(NumActiveRefLayerPics != numRefLayerPics[nuh_layer_id][TemporalId]) <br>               for( i = 0; i < NumActiveRefLayerPics; i++ ) <br>                  inter_layer_pred_layer_idc[ i ] | u(v) |
|          } <br>    } <br>    ... <br>    if(sample_adaptive_offset_enabled_flag){ <br>       slice_sao_luma_flag | u(1) |
|       slice_sao_chroma_flag | u(1) |

TABLE 11-continued

| | Descriptor |
|---|---|
| } | |
| ... | |
| } | |

Referring to Table 11, only when nuh_layer_id is greater than 0, all_ref_layers_active_flag specified in the VPS extension is 0, numRefLayerPics[nuh_layer_id][TemporalId] derived by Equation 4 or 5 is greater than 0, inter_layer_pred_enabled_flag as interlayer reference picture information may be signaled.

Further, only when inter_layer_pred_enabled_flag is 1 and numRefLayerPics[nuh_layer_id][TemporalId] is greater than 1, num_inter_layer_ref_pics_minus1 indicating a number of interlayer reference pictures and inter_layer_pred_layer_idc[i] indicating an interlayer reference picture may be signaled.

Under the foregoing conditions, when max_one_active_ref_layer_flag specified in the VPS extension is 1, num_inter_layer_ref_pics_minus1 indicating the number of interlayer reference pictures may not be signaled. num_inter_layer_ref_pics_minus1 may have a value in a range of 0 to numRefLayerPics[nuh_layer_id][TemporalId]–1 derived by Equation 4 or 5.

Under the foregoing conditions, when NumActiveRefLayerPics is equal to numRefLayerPics[nuh_layer_id][TemporalId], inter_layer_pred_layer_idc[i] indicating the interlayer reference picture may not be signaled.

inter_layer_pred_layer_idc[i] may have a value in a range of 0 to numRefLayerPics[nuh_layer_id][TemporalId] of the layer including the current picture −1, and inter_layer_pred_layer_idc[i] may be inferred to be equal to index 'i' if not signaled.

Here, information on an active reference layer picture available for decoding the current picture may be derived by Equation 7. nuh_layer_id is nuh_layer_id of the current picture, and RefLayerIdListForTid[ ][ ] is a variable having a value of layer_id_in_nuh[ ] of a reference layer derived by Equation 4 or Equation 5.

< Equation 7 > for(i=0, j=0; i<NumActiveRefLayerPics; i++)
   RefPicLayerId[i] = RefLayerIdListForTid[nuh_layer_id][TemporalId]
   [inter_layer_pred_layer_idc[i]]

Meanwhile, in the current draft of the SHVC and MV-HEVC standards, TargetDecLayerIdList as target decoding layer information and TargetOptLayerIdList as target output layer information are derived by Equation 8.

< Equation 8 >

TargetDecLayerSetIdx = output_layer_set_idx_minus1[TargetOptLayerSetIdx]+1
lsIdx = TargetDecLayerSetIdx
for(k=0, j=0; j<NumLayersInIdList[lsIdx]; j++ ){
   TargetDecLayerIdList[j] = LayerSetLayerIdList[lsIdx][j]
   if(output_layer_flag[lsIdx][j])
      TargetOptLayerIdList[k++] = LayerSetLayerIdList[lsIdx][j]

Referring to Equation 8, variable TargetOptLayerSetIdx indicates a target output layer set index and may be converted into a layer set index by output_layer_set_idx_minus1[ ] specified the VPS extension.

NumLayersInIdList specifies a number of layers included in a layer set, and TargetDecLayerIdList specifies a nuh_layer_id value of a layer to decode included in a layer set. TargetOptLayerIdList indicates a nuh_layer_id value of a layer to output included in a layer set.

Only nuh_layer_id of a layer with output_layer_flag equal to 1 may be included in TargetOptLayerIdList.

output_layer_flag[ ][ ] is signaled based on a unit of output layer set in the VPS extension.

However, since ouput_layer_flag is determined not by output layer set but by layer set in Equation 8, information on an output layer may not be normally identified.

Also, since output_layer_flag[i][j] for an i-th output layer set is not specified, i being in a range of 0 to vps_number_layer_sets_minus1, information on an output layer may not be normally identified.

To address such a problem, Equation 8 for deriving TargetDecLayerIdList as target decoding layer information TargetOptLayerIdList as target output layer information may be modified into Equation 9.

output_layer_flag[i][j] of the i-th output layer set may be specified using Equation 9, i being in the range of 0 to vps_number_layer_sets_minus1.

< Equation 9 >

TargetDecLayerSetIdx = output_layer_set_idx_minus1[TargetOptLayerSetIdx]+1
lsIdx = TargetDecLayerSetIdx
for(k=0, j=0; j<NumLayersInIdList[lsIdx]; j++ ){
   TargetDecLayerIdList[j] = LayerSetLayerIdList[lsIdx][j]
   if(output_layer_flag[TargetOptLayerSetIdx][j])
      TargetOptLayerIdList[k++] = LayerSetLayerIdList[lsIdx][j]

In Equation 9, output_layer_flag[i][j] equal to 1 indicates that a j-th layer in the i-th output layer set is a target output layer, and output_layer_flag[i][j] equal to 0 indicates the j-th layer in the i-th output layer set is not a target output layer.

When output_layer_flag indicating whether to output the j-th layer in the output layer set indicated by target output layer set index TargetOptLayerSetIdx is equal to 1, TargetOptLayerIdList as a target output layer ID list including target output layer information may include a layer_id value of the j-th layer in the layer set indicated by target decoding layer set index TargetDecLayerSetIdx.

TargetDecLayerSetIdx may be signaled from output layer set index information signaled via a VPS.

TargetDecLayerIdList as a target decoding layer ID list including target decoding layer information may include the layer_id value of the j-th layer in the layer set indicated by TargetDecLayerSetIdx.

output_layer_flag[i][ ] for an i-th output layer set, i being in a range of 0 to vps_number_layer_sets_minus1, may be inferred as below in (a) and (b), which may be stipulated in the standards.

default_one_target_output_layer_idc is signaled to derive an output layer in an output layer and may have a value in a range of 0 to 3.

default_one_target_output_layer_idc equal to 0 may indicate that all layers in an output layer set are output, and default_one_target_output_layer_idc equal to 1 may indicate that only a highest layer, that is, a layer with a highest layer ID, among the layers included in the output layer set is output.

In addition, default_one_target_output_layer_idc equal to 2 may indicate only a layer with output_layer_flag equal to 1 is output. default_one_target_output_layer_idc equal to 3 may be reserved for future use.

(a) When default_one_target_output_layer_idc specified in the VPS is 1,output_layer_flag[i][j] for the j-th layer included i-th layer set may be inferred to be 1. j is set equal to NumLayersInIdList[i]−1. Otherwise, output_layer_flag[i][j] may be inferred to be 0. Here, j has a value in a range of 0 to NumLayerInIdList[i]−1.

(b) When default_one_target_output_layer_idc specified in the VPS is 0, output_layer_flag[i][j] may be inferred to be 1. Here, j has a value in a range of 0 to NumLayerInIdList[i]−1.

vps_number_layer_sets_minus1 specified in the VPS extension indicates a number of layer sets specified in the VPS. Since an MV-HEVC/SHVC bitstream includes two or more layer sets, vps_number_layer_sets_minus1 is always greater than 1. Thus, vps_number_layer_sets_minus1 encoded in u(10) may be specified to have a value in a range of 1 to 1023. Alternatively, vps_number_layer_sets_minus1 is changed into vps_number_layer_sets_minus2, which may be specified to have a value in a range of 0 to 1022.

Also, the present invention provides a method of indicating a non-reference picture unnecessary for interlayer prediction.

It may be identified based on max_tid_il_ref_pics_plus1[ ][ ] signaled via the VPS extension whether a picture with a highest temporal ID is a non-reference picture or reference picture.

In the current draft of the SHVC and MV-HEVC standards, a picture with a highest temporal ID is marked as a reference picture or non-reference picture as in Equation 10.

When the temporal ID of the currently decoded picture is less than or equal to max_tid_il_ref_pics_plus1[ ][ ] for the upper layer with dependency, remainingInterLayerReferencesFlag for upper layers with dependency on a layer including the currently decoded picture is set equal to 1.

As a result of determining remainingInterLayerReferencesFlag values of all upper layers with dependency on the currently decoded picture, when remainingInterLayerReferencesFlag is 0, the currently decoded picture is marked as "non-reference picture" or "unused for reference."

However, when the currently decoded picture is used as a reference layer for any one of the upper layers with dependency, the currently decoded picture is marked as "reference picture" or "used for reference."

Thus, when remainingInterLayerReferencesFlag indicating a reference picture for one of the upper layers with dependency is 1 in Equation 10, a process of determining remainingInterLayerReferenceFlag values of the remaining upper layers may be omitted and the currently decoded picture may not be changed to a non-reference picture. That is, the currently decoded picture may be considered as a reference picture.

<Equation 11>

The variable remainingInterLayerReferencesFlag is derived as specified in the following:
remainingInterLayerReferencesFlag=0
iLidx—LayerIdxInVps[TargetDecLayerIdList[i]]
    for(j=latestDecIdx+1; j<numTargetDecLayers
      && !remainingInterLayerReferencesFlag; j++){
      jLidx=LayerIdxInVps[TargetDecLayerIdList[j]]
      if(currTid<=(max_tid_il_ref_pics_plus1[iLidx][jLidx]-1))
        for(k=0;   k<NumDirectRefLayers[TargetDecLayerIdList[j]];k++)
          if(TargetDecLayerIdList[i]==RefLayerId[TargetDecLayerIdList[j]][k])
            remainingInterLayerReferencesFlag=1
    }

When remainingInterLayerReferenceFlag is equal to 0, currPic is marked as "unused for reference".

Figure 4:
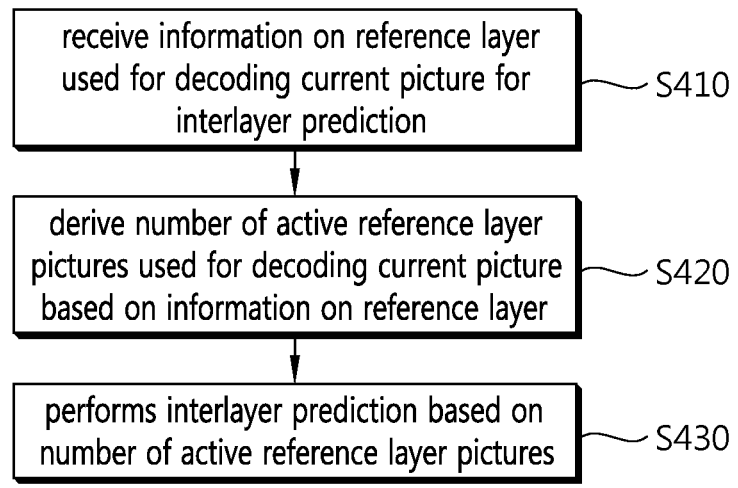
FIG. 4 is a flowchart illustrating a video decoding method according to the present invention.

FIG. 4 is a flowchart illustrating a video decoding method according to the present invention.

---

< Equation 10>

- The variable remainingInterLayerReferencesFlag is derived as specified in the following:
remainingInterLayerReferencesFlag = 0
iLidx - LayerIdxInVps[TargetDecLayerIdList[i]]
    for(j=latestDecIdx+1; j<numTargetDecLayers; j++){
        jLidx = LayerIdxInVps[TargetDecLayerIdList[j]]
        if(currTid<=(max_tid_il_ref_pics_plus1[iLidx][jLidx]-1))
            for(k=0; k<NumDirectRefLayers[TargetDecLayerIdList[j]]; k++)
                if(TargetDecLayerIdList[i] == RefLayerId[TargetDecLayerIdList[j]][k])
                    remainingInterLayerReferencesFlag = 1
    }
- When remainingInterLayerReferenceFlag is equal to 0, currPic is marked as "unused for reference".

---

In Equation 10, currTid indicates a temporal ID of a currently decoded picture, and max_tid_il_ref_pics_plus1[iLidx][jLidx] indicates maximum temporal ID information allowing interlayer prediction in a current layer, which is signaled via the VPS. max_tid_il_ref_pics_plus1[iLidx][jLidx] is signaled by upper layer with dependency on the current layer.

First, the decoding apparatus may receive information on a reference layer used for decoding a current picture for interlayer prediction (S410).

The information on the reference layer may include flag information and information on numbers, such as direct_dependency_flag[i][j] indicating whether a layer with a j index is a direct reference layer for a layer with an i index, sub_layers_vps_max_minus1[i] indicating maximum temporal sub-layer information on each layer, max_tid_il_ref_pics_plus1[i][j] indicating maximum allowed value of temporal sub-layer allowing inter-layer prediction in each layer, a temporal sub-layer ID of the current picture, all_ref_layers_active_flag indicating whether a reference layer picture available for interlayer prediction is present in the same AU as the current picture and included in an interlayer reference picture set of the current picture, the reference layer picture being included in all direct reference layers of a current layer including the current picture and specified by maximum temporal sub-layer information on each layer and maximum allowed value of temporal sub-layer allowing inter-layer prediction in each layer, inter_layer_pred_enabled_flag indicating whether interlayer prediction is used for decoding the current picture, max_one_active_ref layer_flag indicating whether at most one picture is used for interlayer prediction for each picture in a CVS, num_inter_layer_ref_pics_minus1 indicating a number of pictures used for decoding the current picture for interlayer prediction or the like.

The decoding apparatus derives a number of active reference layer pictures used for decoding the current picture based on the information on the reference layer (S420).

All slices belonging to the current picture may the same number of active reference layer pictures.

Figure 5:
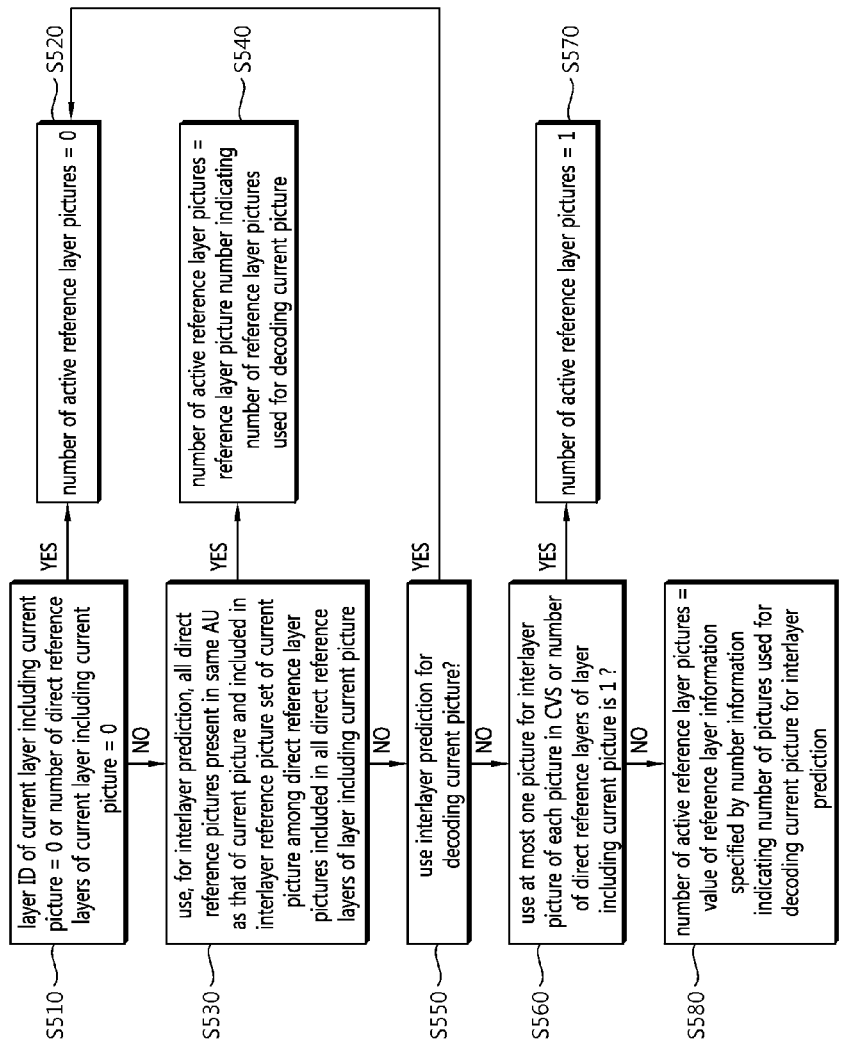
FIG. 5 illustrates a method of deriving a number of active reference layer pictures according to an embodiment of the present invention.

FIG. 5 illustrates a method of deriving a number of active reference layer pictures according to an embodiment of the present invention. A process of deriving the number of active reference layer pictures according to the embodiment will be described below with reference to FIG. 5.

First, it is determined whether a layer ID of a current layer including a current picture is 0 or a number of direct reference layers of the current layer including the current picture is 0 (S510).

When the layer ID of the current layer is 0 or the number of direct reference layers of the current layer is 0, the number of active reference layer pictures is derived to be 0 (S520).

On the contrary, when the layer ID of the current layer is 0 or the number of direct reference layers of the current layer is not 0, it is determined whether all direct reference pictures present in the same AU as that of the current picture and included in an interlayer reference picture set of the current picture among direct reference layer pictures included in all the direct reference layers of the layer including the current picture are used for interlayer prediction (S530).

Operation S530 may be determined based on flag information all_ref_layers_active_flag. When all_ref_layers_active_flag is equal to 1, the number of active reference layer pictures may be derived to be equal to a reference layer picture number indicating a number of reference layer pictures used for decoding the current picture (S540).

The reference layer picture number is derived based on a variable indicating the number of direct reference layers of the current layer, maximum temporal sub-layer information on each layer, maximum allowed value of temporal sub-layer allowing inter-layer prediction in each layer, and a temporal ID of the current picture. Here, among the pictures in the direct reference layers of the layer including the current picture, pictures in a reference layer which has maximum temporal sub-layer information greater than or equal to the temporal ID of the current picture and maximum temporal sub-layer information for the current layer greater than the temporal ID of the current picture may be considered as reference layer pictures available for decoding the current picture for interlayer prediction.

When all_ref_layers_active_flag is 0, it is determined through interlayer er_pred_enabled_flag whether interlayer prediction is used for decoding the current picture (S550). When inter_layer_pred_enabled_flag is 0, the number of active reference layer pictures is derived to be 0 (S520).

Otherwise, it is determined whether at most one picture is used for interlayer picture of each picture in a CVS or the number of direct reference layers of the layer including the current picture is 1 (S560).

When max_one_active_ref layer_flag is 1 or the number of direct reference layers of the layer including the current picture is 1, the number of active reference layer pictures is derived to be 1 (S570).

When the foregoing determination conditions are not satisfied, the number of active reference layer pictures may be derived to be a value of reference layer information specified by num_inter_layer_ref_pics_minus1 indicating a number of pictures used for decoding the current picture for interlayer prediction (S580).

Referring back to FIG. 4, when the number of active reference layer pictures is derived, the decoding apparatus performs interlayer prediction based on the number of active reference layer pictures (S430).

As described above, the present invention provides a method of signaling layer information present in a video encoded bitstream of a multilayer structure including a temporal layer, an interlayer prediction method, a method of obtaining a target output layer and an apparatus using the same.

The present invention also provides a method of accessing layer information specified in a VPS in a bitstream for session negotiations without an entropy decoder and an apparatus using the same.

In the aforementioned embodiments, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

The foregoing embodiments include various aspects of examples. Although all possible combinations to illustrate various aspects may not described herein, it will be understood by those skilled in the art that various combinations may be made therein without departing from the spirit and scope of the invention as defined by the appended claims. Therefore, all differences, changes and modifications within the scope will be construed as being included in the present invention.

The invention claimed is:

1. A method of decoding a video supporting a plurality of layers performed by a decoding apparatus, the method comprising:
  receiving information on a reference layer used for decoding a current picture for interlayer prediction;
  deriving a number of active reference layer pictures used for decoding the current picture based on the information on the reference layer; and
  performing interlayer prediction based on the number of active reference layer pictures,
  wherein when a layer identifier of a current layer comprising the current picture is not 0 and when a number of reference layer pictures available for interlayer prediction in the same access unit as that of the current picture is not 0, and when a reference layer picture available for interlayer prediction specified by values of maximum temporal sub-layer information on each layer and information on maximum allowed value of temporal sub-layer allowing inter-layer prediction in each layer among direct reference layer pictures comprised in all the direct reference layers of the current layer is present in the same access unit as that of the current picture and included in an interlayer reference picture set of the current picture, the number of active reference layer pictures is derived to be equal to the number of reference layer pictures, and wherein the number of reference layer pictures is derived based on information indicating a number of direct reference layers of the current layer, the maximum temporal sub-layer information on each layer, the information on maximum allowed value of temporal sub-layer allowing inter-layer prediction in each layer and a temporal identifier of the current picture, and among the pictures in the direct reference layers of the current layer comprising the current picture, a picture in a reference layer is considered as a reference layer picture available for decoding the current picture for interlayer prediction when maximum temporal sub-layer information of the reference layer is greater than or equal to the temporal identifier of the current picture and either when information on maximum allowed value of temporal sub-layer allowing inter-layer prediction in the reference layer for the current layer is greater than the temporal identifier of the current picture or when the temporal identifier of the current picture is 0.

2. The method of claim 1, wherein all slices of the current picture have the same number of active reference layer pictures.

3. The method of claim 1, wherein when a layer identifier of a current layer comprising the current picture is 0, the number of active reference layer pictures is derived to be 0.

4. The method of claim 1, wherein when a number of reference layer pictures available for interlayer prediction in the same access unit as that of the current picture is 0, the number of active reference layer pictures is derived to be 0.

5. The method of claim 1, wherein when interlayer prediction is not used for decoding the current picture, the number of active reference layer pictures is derived to be 0.

6. The method of claim 1, wherein when at most one picture is used for interlayer prediction for each picture in a coding video sequence or when a number of direct reference layers of the layer comprising the current picture is 1, the number of active reference layer pictures is derived to be 1.

7. The method of claim 1, wherein when the information on the reference layer comprises number information indicating a number of pictures used for decoding the current picture for interlayer prediction, the number of active reference layer pictures is derived to be a value specified by the number information.

8. An apparatus for decoding a video supporting a plurality of layers, the apparatus comprising:
a decoder configured to receive information on a reference layer used for decoding a current picture for interlayer prediction, derive a number of active reference layer pictures used for decoding the current picture based on received the information on the reference layer and perform interlayer prediction based on the number of active reference layer pictures,
wherein when a layer identifier of a current layer comprising the current picture is not 0 and when a number of reference layer pictures available for interlayer prediction in the same access unit as that of the current picture is not 0, and when a reference layer picture available for interlayer prediction specified by values of maximum temporal sub-layer information on each layer and information on maximum allowed value of temporal sub-layer allowing inter-layer prediction in each layer among direct reference layer pictures comprised in all the direct reference layers of the current layer is present in the same access unit as that of the current picture and included in an interlayer reference picture set of the current picture, the number of active reference layer pictures is derived to be equal to the number of reference layer pictures, and wherein the number of reference layer pictures is derived based on information indicating a number of direct reference layers of the current layer, the maximum temporal sub-layer information on each layer, the information on maximum allowed value of temporal sub-layer allowing inter-layer prediction in each layer and a temporal identifier of the current picture, and among the pictures in the direct reference layers of the current layer comprising the current picture, a picture in a reference layer is considered as a reference layer picture available for decoding the current picture for interlayer prediction when maximum temporal sub-layer information of the reference layer is greater than or equal to the temporal identifier of the current picture and either when information on maximum allowed value of temporal sub-layer allowing inter-layer prediction in the reference layer for the current layer is greater than the temporal identifier of the current picture or when the temporal identifier of the current picture is 0.

9. The apparatus of claim 8, wherein when a layer identifier of a current layer comprising the current picture is 0, the number of active reference layer pictures is derived to be 0.

10. The apparatus of claim 8, wherein when a number of reference layer pictures available for interlayer prediction in the same access unit as that of the current picture is 0, the number of active reference layer pictures is derived to be 0.

11. The apparatus of claim 8, wherein when interlayer prediction is not used for decoding the current picture, the number of active reference layer pictures is derived to be 0.

12. The apparatus of claim 8, wherein when at most one picture is used for interlayer prediction for each picture in a coding video sequence or when a number of direct reference layers of the layer comprising the current picture is 1, the number of active reference layer pictures is derived to be 1.

13. A method of encoding a video supporting a plurality of layers performed by an encoding apparatus, the method comprising:
determining information on a reference layer used for encoding a current picture for interlayer prediction;
deriving a number of active reference layer pictures used for encoding the current picture based on the information on the reference layer; and
performing interlayer prediction based on the number of active reference layer pictures,
wherein when a layer identifier of a current layer comprising the current picture is not 0 and when a number of reference layer pictures available for interlayer prediction in the same access unit as that of the current picture is not 0, and when a reference layer picture available for interlayer prediction specified by values of maximum temporal sub-layer information on each layer and information on maximum allowed value of temporal sub-layer allowing inter-layer prediction in each layer among direct reference layer pictures comprised in all the direct reference layers of the current layer is present in the same access unit as that of the current picture and included in an interlayer reference picture set of the current picture, the number of active reference layer pictures is derived to be equal to the number of reference layer pictures, and wherein the number of reference layer pictures is derived based on information indicating a number of direct reference layers of the current layer, the maximum temporal sub-layer information on each layer, the information on maximum allowed value of temporal sub-layer allowing inter-layer prediction in each layer and a temporal identifier of the current picture, and among the pictures in the direct reference layers of the current layer comprising the current picture, a picture in a reference layer is considered as a reference layer picture available for decoding the current picture for interlayer prediction when maximum temporal sub-layer information of the reference layer is greater than or equal to the temporal identifier of the current picture and either when information on maximum allowed value of temporal sub-layer allowing inter-layer prediction in the reference layer for the current layer is greater than the temporal identifier of the current picture or when the temporal identifier of the current picture is 0.

14. An apparatus for encoding a video supporting a plurality of layers, the apparatus comprising:

an encoder configured to determine information on a reference layer used for encoding a current picture for interlayer prediction, derive a number of active reference layer pictures used for encoding the current picture based on the information on the reference layer, and perform interlayer prediction based on the number of active reference layer pictures, wherein when a layer identifier of a current layer comprising the current picture is not 0 and when a number of reference layer pictures available for interlayer prediction in the same access unit as that of the current picture is not 0, and when a reference layer picture available for interlayer prediction specified by values of maximum temporal sub-layer information on each layer and information on maximum allowed value of temporal sub-layer allowing inter-layer prediction in each layer among direct reference layer pictures comprised in all the direct reference layers of the current layer is present in the same access unit as that of the current picture and included in an interlayer reference picture set of the current picture, the number of active reference layer pictures is derived to be equal to the number of reference layer pictures, and wherein the number of reference layer pictures is derived based on information indicating a number of direct reference layers of the current layer, the maximum temporal sub-layer information on each layer, the information on maximum allowed value of temporal sub-layer allowing inter-layer prediction in each layer and a temporal identifier of the current picture, and among the pictures in the direct reference layers of the current layer comprising the current picture, a picture in a reference layer is considered as a reference layer picture available for decoding the current picture for interlayer prediction when maximum temporal sub-layer information of the reference layer is greater than or equal to the temporal identifier of the current picture and either when information on maximum allowed value of temporal sub-layer allowing inter-layer prediction in the reference layer for the current layer is greater than the temporal identifier of the current picture or when the temporal identifier of the current picture is 0.

15. A non-transitory computer-readable medium storing a bitstream that is generated by a method of encoding a video supporting a plurality of layers, the method comprising:

determining information on a reference layer used for encoding a current picture for interlayer prediction;

deriving a number of active reference layer pictures used for encoding the current picture based on the information on the reference layer; and performing interlayer prediction based on the number of active reference layer pictures, wherein when a layer identifier of a current layer comprising the current picture is not 0 and when a number of reference layer pictures available for interlayer prediction in the same access unit as that of the current picture is not 0, and when a reference layer picture available for interlayer prediction specified by values of maximum temporal sub-layer information on each layer and information on maximum allowed value of temporal sub-layer allowing inter-layer prediction in each layer among direct reference layer pictures comprised in all the direct reference layers of the current layer is present in the same access unit as that of the current picture and included in an interlayer reference picture set of the current picture, the number of active reference layer pictures is derived to be equal to the number of reference layer pictures, and wherein the number of reference layer pictures is derived based on information indicating a number of direct reference layers of the current layer, the maximum temporal sub-layer information on each layer, the information on maximum allowed value of temporal sub-layer allowing inter-layer prediction in each layer and a temporal identifier of the current picture, and among the pictures in the direct reference layers of the current layer comprising the current picture, a picture in a reference layer is considered as a reference layer picture available for decoding the current picture for interlayer prediction when maximum temporal sub-layer information of the reference layer is greater than or equal to the temporal identifier of the current picture and either when information on maximum allowed value of temporal sub-layer allowing inter-layer prediction in the reference layer for the current layer is greater than the temporal identifier of the current picture or when the temporal identifier of the current picture is 0.

* * * * *